US012770062B2

(12) United States Patent
Janusz et al.

(10) Patent No.: US 12,770,062 B2
(45) Date of Patent: Oct. 20, 2026

(54) EXPLANATION OF A CAUSE OF A MISTAKE IN A MACHINE LEARNING MODEL USING A DIAGNOSTIC ARTIFICIAL INTELLIGENCE MODEL

(71) Applicants: Andrzej Janusz, Warsaw (PL); Andżelika Zalewska-Küpçü, Sławno (PL); Łukasz Wawrowski, Łąka (PL); Piotr Biczyk, Warsaw (PL); Jan Ludziejewski, Warsaw (PL); Marek Sikora, Katowice (PL); Dominik Ślęzak, Warsaw (PL)

(72) Inventors: Andrzej Janusz, Warsaw (PL); Andżelika Zalewska-Küpçü, Sławno (PL); Łukasz Wawrowski, Łąka (PL); Piotr Biczyk, Warsaw (PL); Jan Ludziejewski, Warsaw (PL); Marek Sikora, Katowice (PL); Dominik Ślęzak, Warsaw (PL)

( * ) Notice: Subject to any disclaimer, the term of this patent is extended or adjusted under 35 U.S.C. 154(b) by 677 days.

(21) Appl. No.: 18/217,051

(22) Filed: Jun. 30, 2023

(65) Prior Publication Data

US 2025/0005433 A1 Jan. 2, 2025

(51) Int. Cl.
*G06N 5/045* (2023.01)
*G06F 18/21* (2023.01)
(Continued)

(52) U.S. Cl.
CPC ........... *G06N 20/00* (2019.01); *G06F 18/217* (2023.01); *G06N 5/045* (2013.01); *G06Q 10/067* (2013.01)

(58) Field of Classification Search
CPC ....... G06N 5/045; G06N 20/00; G06F 18/217
See application file for complete search history.

(56) References Cited

U.S. PATENT DOCUMENTS

| | | | |
|---|---|---|---|
| 7,689,455 | B2 | 3/2010 | Fligler et al. |
| 7,877,642 | B2 | 1/2011 | Ding et al. |

(Continued)

FOREIGN PATENT DOCUMENTS

| | | | |
|---|---|---|---|
| CN | 106779088 | B | 4/2019 |
| CN | 110717665 | B | 11/2022 |

(Continued)

OTHER PUBLICATIONS

"Analysis of Explainable Artificial Intelligence on Time Series Data", by Natalia Jakubiak, Published at Universitat Politécnica de Catalunya (UPC)—BarcelonaTech, Published on [Oct. 19, 2022] https://upcommons.upc.edu/bitstream/handle/2117/376475/171756.pdf?sequence=1&isAllowed=y.

(Continued)

*Primary Examiner* — Beau D Spratt
(74) *Attorney, Agent, or Firm* — LegalForce RAPC Worldwide

(57) ABSTRACT

In one embodiment, a method includes forming a diagnostic model using machine learning by ingesting trusted operational data. The method determines that a predictive data produced by an evaluated model for a period of time does not match a known trusted data for the period of time. The method analyzes whether the predictive data produced by the evaluated model for the period of time is an optimal result of the evaluated model. A determination is made that a mistake occurred when the predictive data is not the optimal result of the evaluated model. A cause of the mistake is explained using the diagnostic model. Lastly, fine-tuning the diagnostic model is performed based on learnings from a past predictive data for different periods of time when compared with past known trusted data for the different periods of time using a processor and a memory.

41 Claims, 16 Drawing Sheets

(51) Int. Cl.

| | |
|---|---|
| ***G06N 20/00*** | (2019.01) |
| *G06Q 10/067* | (2023.01) |

(56) References Cited

U.S. PATENT DOCUMENTS

| | | | | |
|---|---|---|---|---|
| 9,916,194 | B2 | 3/2018 | Pang | |
| 10,296,848 | B1 | 5/2019 | Mars et al. | |
| 10,510,022 | B1 | 12/2019 | Tharrington et al. | |
| 11,003,568 | B2 | 5/2021 | Smith et al. | |
| 11,049,043 | B2 | 6/2021 | Dalli et al. | |
| 11,080,616 | B2 | 8/2021 | Zeiler et al. | |
| 11,226,892 | B2 | 1/2022 | Kochura et al. | |
| 11,256,989 | B2 | 2/2022 | Dalli et al. | |
| 11,315,030 | B2 | 4/2022 | Cataltepe | |
| 11,321,364 | B2 | 5/2022 | Lee et al. | |
| 11,367,184 | B2 | 6/2022 | Tosun et al. | |
| 11,372,708 | B2 | 6/2022 | Cheriton | |
| 11,403,544 | B1 | 8/2022 | Hermoni et al. | |
| 11,429,895 | B2 | 8/2022 | Yakovlev et al. | |
| 11,430,171 | B2 | 8/2022 | Amer et al. | |
| 11,449,045 | B2 | 9/2022 | Han | |
| 11,463,457 | B2 | 10/2022 | Bazalgette et al. | |
| 11,475,326 | B2 | 10/2022 | Cmielowski et al. | |
| 11,477,222 | B2 | 10/2022 | Dunn et al. | |
| 11,531,915 | B2 | 12/2022 | Hetherington et al. | |
| 11,537,506 | B1 | 12/2022 | Dasgupta et al. | |
| 11,580,422 | B1 | 2/2023 | Wubbels et al. | |
| 11,615,331 | B2 | 3/2023 | Li et al. | |
| 11,621,077 | B2 | 4/2023 | Neumann | |
| 11,676,365 | B2 | 6/2023 | Kar et al. | |
| 11,699,019 | B2 | 7/2023 | Souche et al. | |
| 11,710,034 | B2 | 7/2023 | Anderson et al. | |
| 11,720,819 | B2 | 8/2023 | Liu et al. | |
| 2006/0101017 | A1* | 5/2006 | Eder | G06F 16/9535 |
| 2011/0178964 | A1* | 7/2011 | Tseng | G06N 5/04 706/47 |
| 2015/0178638 | A1* | 6/2015 | Deshpande | G06Q 20/4016 706/14 |
| 2016/0203036 | A1 | 7/2016 | Mezic et al. | |
| 2017/0212829 | A1 | 7/2017 | Bales et al. | |
| 2019/0034822 | A1* | 1/2019 | Farré Guiu | G06N 5/022 |
| 2019/0147369 | A1 | 5/2019 | Gupta et al. | |
| 2019/0325333 | A1* | 10/2019 | Chan | G06F 18/2163 |
| 2020/0193313 | A1 | 6/2020 | Ghanta et al. | |
| 2020/0293932 | A1 | 9/2020 | Ghosh et al. | |
| 2021/0073060 | A1 | 3/2021 | Grant et al. | |
| 2021/0125104 | A1* | 4/2021 | Christiansen | G06N 20/00 |
| 2021/0133610 | A1 | 5/2021 | Natesan Ramamurthy et al. | |
| 2021/0303695 | A1* | 9/2021 | Grosse | G06F 17/18 |
| 2021/0334695 | A1* | 10/2021 | Raj | G06F 11/3409 |
| 2021/0374533 | A1 | 12/2021 | Muffat et al. | |
| 2022/0066905 | A1 | 3/2022 | Lee et al. | |
| 2022/0253443 | A1 | 8/2022 | Gold et al. | |
| 2022/0358364 | A1 | 11/2022 | Allen | |
| 2022/0391670 | A1 | 12/2022 | Dalli et al. | |
| 2023/0019198 | A1* | 1/2023 | Zhang | G06N 3/09 |
| 2023/0061280 | A1* | 3/2023 | Rohrkemper | G06N 20/00 |
| 2023/0130567 | A1 | 4/2023 | Cohen et al. | |
| 2023/0171276 | A1 | 6/2023 | Bisht et al. | |
| 2023/0196101 | A1 | 6/2023 | Ghanta et al. | |
| 2023/0205663 | A1 | 6/2023 | Nyati et al. | |
| 2024/0362507 | A1* | 10/2024 | Geada | H04L 41/16 |

FOREIGN PATENT DOCUMENTS

| | | | |
|---|---|---|---|
| EP | 4086029 | A1 | 11/2022 |
| KR | 102089688 | B1 | 4/2020 |
| KR | 20210078256 | A | 6/2021 |
| KR | 102367831 | B1 | 2/2022 |
| KR | 20220088670 | A | 6/2022 |
| WO | 2020213750 | A1 | 10/2020 |
| WO | 2022079107 | A1 | 4/2022 |

OTHER PUBLICATIONS

"Explainable Predictive Maintenance", by Sepideh Pashami et al., Published at Center for Applied Intelligent Systems Research, Halmstad University, Sweden, Published on [Jun. 9, 2023] https://arxiv.org/pdf/2306.05120.pdf.

"Explainable Artificial Intelligence and Machine Learning", by M. S. Raunak et al., Published at National Institute of Standards and Technology, Published on [Oct. 2021] https://ieeexplore.ieee.org/stamp/stamp.jsp?tp=&arnumber=9548017.

"A Generalized Explanation Framework for Visualization of Deep Learning Model Predictions", by Pei Wang et al., Published at IEEE Transactions on Pattern Analysis And Machine Intelligence, vol. 45, No. 8, Published on [ Aug. 2023] https://ieeexplore.ieee.org/stamp/stamp.jsp?tp=&arnumber=10034989.

"Bearing Fault Detection and Diagnosis Using Case Western Reserve University Dataset With Deep Learning Approaches: A Review", by Dhiraj Neupane et al., Published at IEEE Access, Published on [Apr. 27, 2020] https://ieeexplore.ieee.org/stamp/stamp.jsp?tp=&arnumber=9078761.

"Deep Learning Algorithms for Bearing Fault Diagnostics—A Comprehensive Review", by Shen Zhang et al., Published at IEEE Access, Published on [Feb. 10, 2020] https://ieeexplore.ieee.org/stamp/stamp.jsp?tp=&arnumber=8988271.

"Applications of Artificial Intelligence in Machine Learning: Review and Prospect", by Sumit Das et al., Published at International Journal of Computer Applications, Published on [Apr. 9, 2015] https://citeseerx.ist.psu.edu/document?repid=rep1&type=pdf&doi=68508ffc9175462fd31de620d03093b214734011.

"Explainable Artificial Intelligence (XAI)", by David Gunning, Published at DARPA, Published on [Nov. 2017] https://nsarchive.gwu.edu/sites/default/files/documents/5794867/National-Security-Archive-David-Gunning-DARPA.pdf.

"Explainable articial intelligence (XAI) enabled anomaly detection and fault classication of an industrial asset", by Jeetesh Sharma et al., Published at Research Square, Published on [Apr. 19, 2023] https://assets.researchsquare.com/files/rs-2780708/v1_covered.pdf?c=1681923085.

"Explainable Software Fault Localization Model: From Blackbox to Whitebox", by Abdulaziz Alhumam, Published at Tech Science Press, Published on [May 18, 2022] https://www.techscience.com/cmc/v73n1/47875/pdf.

"Explainable AI: A Review of Machine Learning Interpretability Methods", by Pantelis Linardatos et al., Published at Entropy 2021, Published on [Dec. 25, 2020] https://pdfs.semanticscholar.org/88cd/9f6e7c26046e117fcccd9ad6a33fdb8619be.pdf.

"A machine learning framework for performance anomaly detection", by Muhammad Hasnain et al., Published at Journal of Korean Society for Internet Information, Published on [Apr. 2022] https://koreascience.kr/article/JAKO202213841078563.pdf.

"A Historical Perspective of Explainable Artificial Intelligence", by Roberto Confalonieri et al., Published at WIREs Data Mining and Knowledge Discovery, Published on [Sep. 21, 2020] https://wires.onlinelibrary.wiley.com/doi/epdf/10.1002/widm.1391.

"Meaningfully Debugging Model Mistakes using Conceptual Counterfactual Explanations", by Abubakar Abid et al., Published at International Conference on Machine Learning, Baltimore, Maryland, Published on [Jun. 24, 2021] https://proceedings.mlr.press/v162/abid22a/abid22a.pdf.

"Explainable Artificial Intelligence: Understanding, Visualizing And Interpreting Deep Learning Models". by Wojciech Samek et al., Published at International Telecommunication Union Journal: ICT Discoveries, Published on [Oct. 13, 2017] https://www.itu.int/dms_pub/itu-s/opb/journal/S-JOURNAL-ICTF.VOL1-2018-1-P05-PDF-E.pdf.

* cited by examiner

EXPLANATION OF A CAUSE OF A MISTAKE IN A MACHINE LEARNING MODEL USING A DIAGNOSTIC ARTIFICIAL INTELLIGENCE MODEL

FIELD OF TECHNOLOGY

This disclosure relates generally to the field of explainable artificial intelligence, and, more particularly, to a method and system to explain a cause of a mistake in a machine learning model using a diagnostics artificial intelligence model.

BACKGROUND

A machine learning model may be a mathematical representation and/or an algorithm that is trained on data to make predictions (or decisions) without being explicitly programmed. The machine learning model may be designed to learn patterns and relationships from input data, which could be numerical values, text, images, and/or any other type of structured or unstructured data. During the training process, the machine meaning model may be presented with a set of labeled examples, known as the training data, and may adjust its internal parameters to find patterns and correlations in the data.

Unfortunately, the machine learning model may not always be accurate. When the machine learning model makes mistakes, negative consequences, such as making wrong decisions in business processes and/or choosing sub-optimal solutions to real-life problems can arise. For example, a medical diagnosis model making false negatives (failing to identify a disease) or false positives (incorrectly identifying a disease) can have serious implications for patient health. In addition, mistakes made by the machine learning model can lead to financial losses, particularly in industries where automated decision-making is prevalent. For instance, an algorithmic trading model making incorrect predictions can result in significant financial losses for investors or institutions.

Moreover, if the machine learning model is trained on biased data or exhibits biases in their predictions, it can lead to unfair treatment or discrimination against certain individuals or groups. This can perpetuate existing social biases and exacerbate societal inequalities. In addition, the machine learning model can inadvertently reveal sensitive or personal information through their mistakes. For instance, a recommender system recommending inappropriate or sensitive content to users can compromise privacy and cause harm.

Repeated mistakes by the machine learning model can erode trust and confidence in the system. Organizers and sponsors of online data science competitions may find it difficult to detect all errors and gain insight into the performance of solutions submitted by contestants. Therefore, they may have difficulties in suggesting improvements to the models and facilitate their deployment in production-ready environments. Users may lose faith in the technology, leading to a reluctance to adopt or rely on it. This can hinder the widespread acceptance and utilization of machine learning solutions. In addition, mistakes made by the machine learning model can raise legal and ethical concerns. If mistakes result in harm to individuals or violate regulations, there can be legal consequences for the organization responsible for deploying the model. In the end, mistakes made by the machine learning model can have broader societal impacts. For example, an autonomous vehicle's incorrect decision-making could result in accidents, injuries, or loss of life.

SUMMARY

Disclosed are a method and/or a system to explain a cause of a mistake in a machine learning model using a diagnostics artificial intelligence model.

In one aspect, a method includes forming a diagnostic model using machine learning by ingesting trusted operational data. The trusted operational data may be a supply chain data, a sales data, a purchase data, a fulfillment data, a sensory capture data, an observation data, an empirical data, a historical data, an industrial data, and/or a financial data. The method may determine that a predictive data produced by an evaluated model for a period of time does not match a known trusted data for the period of time. The method analyzes whether the predictive data produced by the evaluated model for the period of time may be an optimal result of the evaluated model. A determination may be made that a mistake occurred when the predictive data is not the optimal result of the evaluated model. A cause of the mistake may be explained using the diagnostic model. Lastly, fine-tuning the diagnostic model may be performed based on learnings from a past predictive data for different periods of time when compared with past known trusted data for the different periods of time using a processor and a memory.

The method may compare the predictive data of the evaluated model with a simulated prediction of the diagnostic model when the mistake is observed. The diagnostic model may explain the cause of the mistake. Explaining the cause of the mistake may be applied to diagnose a black-box model without requiring any knowledge about technical specifications of a specific machine learning algorithm of the black-box model and without having direct access to it. The diagnostic model may be applied on a diagnosed dataset and an output of the evaluated model comprising at least one of a prediction and a classification, without using predictions on a training set.

The method may generate a most probable explanation of the cause of the mistake as a natural language text. The method may further determine the cause of the mistake may be because a labeling of a historical training data set on which the evaluated model was formed was erroneous. The method may further determine the cause of the mistake may be because an external condition changed which caused the predictive data produced by the evaluated model to no longer conform to predictive trends. The method may further determine the cause of the mistake may be because of an error in an input data to the evaluated model which may be caused by any one of an inaccurate sensor reading, a human error, and an anomaly. The method may further determine the cause of the mistake may be because an input data may be a novel scenario from previous input scenarios, and the evaluated model may be unprepared in the novel scenario.

The method may further determine the cause of the mistake may be because of concept drift in a relationship between an input data and the predictive data caused because a property of a target variable has changed over time. The method may further determine the cause of the mistake may be because the evaluated model may be underfitted because while a similar input data to an input data happened in the past, the evaluated model was not sufficiently fitted to the input data. The method may further determine the cause of the mistake may be because the evaluated model may be overfitted because the diagnosed machine learning model may be unable to generalize away from a narrow band of deep optimizations to extrapolate to a general case.

The method may further determine the cause of the mistake may be because the evaluated model may be based on an anomaly meaning that normally the evaluated model would be correct and that a human decision maker would most likely make the same mistake in this special case because of a unique condition of an input data now received and this mistake may be caused by a non-determinism of a problem. The method may further determine the cause of the mistake may be because an input data to the evaluated model may be based on an intentional attack caused by malignant actors attempting to undermine an integrity of the evaluated model and this intentional attack may be an intentional modification of the input data to the model.

The method may further determine the cause of the mistake and a corresponding fix recommendation, which suggests how to improve performance of the evaluated model. The method may then generate a visual report emphasising a ranked set of important findings based on an order of importance, which may comprise relevant statistics related to the evaluated model, the quality of its approximator, and the distributions of a diagnostic attribute. Furthermore, the visual report may include an interactive plot to help to explore diagnoses for individual instances and analyze their statistics for specific groups. The visual report may provide insights on the importance of original attributes, approximated by significance of attributes in the diagnostic model.

The method may further generate reports containing relevant statistics related to the diagnostic model, the quality of its approximator, and the distributions of diagnostic attributes. Furthermore, the diagnostic model may be a system that may be responsible for making a diagnosis of causes of errors made by the evaluated model that may be being diagnosed and whose prediction is already a concrete cause of error, and the approximator may be encapsulated within the diagnostic model comprising of an ensemble of rough-set models for determining approximations and neighborhoods.

The method may further generate interactive plots to explore diagnoses for individual instances and analyze their statistics for specific groups. The method may further determine the importance of original attributes, approximated by the significance of attributes in the diagnostic model, and the diagnostic model may be a surrogate model. The method may further generate a set of historical neighborhoods comprising a set of historical instances that were processed in a similar way to the current instance on which mistakes of the diagnosed machine learning model may be observable. The method may further form a set of diagnostic attributes which describe a current instance through analysis of contents of the historical neighborhoods. The method may form the diagnostic model as a decision model which obtains vectors of the set of diagnostic attributes as an input data and deliver a most probable cause of the mistake as an output data of the diagnostic model. The method may further form the diagnostic model based on an analysis of mistakes registered in the set of neighborhoods.

The method may further form the diagnostic model based on the trusted operational data and the past predictive data for different periods of time when compared with past known trusted data for the different periods of time using rough set-based models in which intelligent systems may be characterized by insufficient and incomplete information. The method may further compute accurate approximations of past predictive data with rough set-based surrogate models and a heuristic optimization method.

The method may further base a surrogate machine learning model on the trusted operational data produced by the evaluated model, automatically apply a method of discretization, apply an algorithm to determine high-quality approximations, obtain trusted neighborhoods of each current instance by looking for trusted instances that were processed in a similar way by the surrogate machine learning model, and train the surrogate machine learning model as a model approximator.

The method may further obtain a set of neighborhoods using the model approximator comprising an ensemble of approximate reducts known from the theory of rough sets and determine a specific neighborhood of a diagnosed instance through a decision process of the model approximator, wherein the neighborhood for a diagnosed instance relative to a single reduct may be a subset of instances from the historical training dataset which belong to the same indiscernibility class. The final neighborhood may be the sum of neighborhoods computed for all reducts in the ensemble. The instances from neighborhoods may have weights that express how representative they may be for a given neighborhood.

The method may further approximate how many reducts in the ensemble of approximate reducts may be able to process in a same way a given pair of instances, count how many reducts the given pair of instances of the ensemble may be processed in the same way, and determine a similarity measure between instances through the counting of how many reducts in the ensemble the given pair of instances may be processed in the same way. The method may further analyze the specific neighborhood to determine characteristics comprising at least one of consistency of ground truth labels, consistency of original model predictions, consistency of approximations, neighborhood size, and uncertainty of predictions. The method may then determine a set of characteristics through analyzing the specific neighborhood to determine consistency of labels comprising at least one of ground truth labels, original model predictions, approximations, size, and uncertainty of predictions.

The method may further specify diagnostic attributes that can be derived from contents of computed neighborhoods through analyzing the specific neighborhood to determine characteristics and through determination of the set of characteristics. The method may further provide meaningful information on model operations by including the set of characteristics as diagnostic attributes that constitute an input in diagnostic rules and may link values of the diagnostic attributes to a set of possible causes of mistakes. Furthermore, when a neighborhood of a particular current instance is in at least one of a null and a minimal condition, then a probable cause of the mistake of the evaluated model on the particular current instance may be that this is a totally new dissimilar case to historic cases and the evaluated model was unprepared for such cases.

In another aspect, a system includes a processing system comparing a bank of computation processors and associated memory, a network, and a diagnostic module coupled with the processing system through the network. The diagnostic module further comprises an ingestion module to form a diagnostic model using machine learning by ingesting trusted operational data. The trusted operational data may be any one of a supply chain data, a sales data, a purchase data, a fulfillment data, a sensory capture data, an observation data, an empirical data, a historical data, an industrial data, or a financial data. The system further contains a matching module to determine that a predictive data produced by an evaluated model for a period of time does not match a known trusted data for the period of time, an optimization module to analyze whether the predictive data produced by the evaluated model for the period of time may be an optimal result of the evaluated model, a mistake-identification module to determine that a mistake occurred when the predictive data may not be the optimal result of the evaluated model, an explanation module to explain a cause of the mistake using the diagnostic model, and a tuning module to fine-tune the diagnostic model based on learnings from a past predictive data for different periods of time when compared with past known trusted data for the different periods of time using the processing system.

The system may further comprise an explanation module to compare the predictive data of the evaluated model with a simulated prediction of the diagnostic model when the mistake may be observed to explain the cause of the mistake using the diagnostic model. Furthermore, explaining the cause of the mistake may be applied to diagnose a black-box model without requiring any knowledge about technical specifications of a specific machine learning algorithm of the black-box model and without having direct access to it, and the diagnostic model may be applied on a diagnosed dataset and an output of the evaluated model comprising at least one of a prediction and a classification, without using predictions on a training set.

The system may further comprise a natural language module to generate a most probable explanation of the cause of the mistake as a natural language text. The system may further comprise a label-analysis module to determine the cause of the mistake may be because a labeling of a historical training data set on which the evaluated model was formed was erroneous. The system may further comprise an external-change module to determine the cause of the mistake may be because an external condition changed that caused the predictive data produced by the evaluated model to no longer conform to predictive trends.

In yet another aspect, a method includes determining that a predictive data produced by an evaluated model for a period of time does not match a known trusted data for the period of time, analyzing whether the predictive data produced by the evaluated model for the period of time may be an optimal result of the evaluated model, determining that a mistake occurred when the predictive data may not be the optimal result of the evaluated model, and explaining a cause of the mistake using a diagnostic model. Furthermore, the method compares the predictive data of the evaluated model with a simulated prediction of the diagnostic model when the mistake is observed to explain the cause of the mistake using the diagnostic model.

The methods and systems disclosed herein may be implemented in any means for achieving various aspects, and may be executed in various forms, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method and/or a system to explain a cause of a mistake in a machine learning model using a diagnostics artificial intelligence model.

Figure 1:
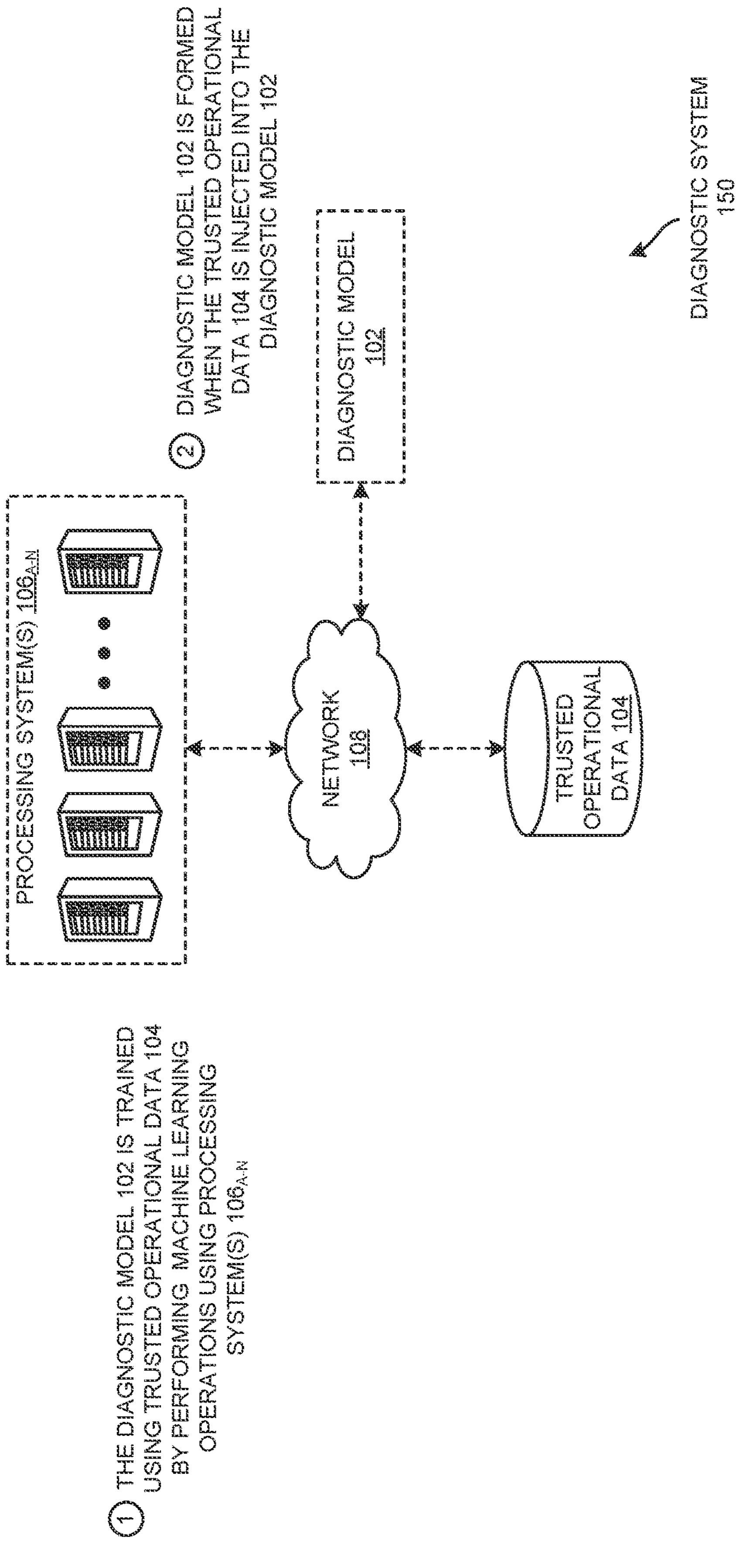
FIG. 1 is a diagnostic system of a diagnostic model communicatively coupled with a processing system and a trusted operational data, according to one embodiment.
Figure 2:
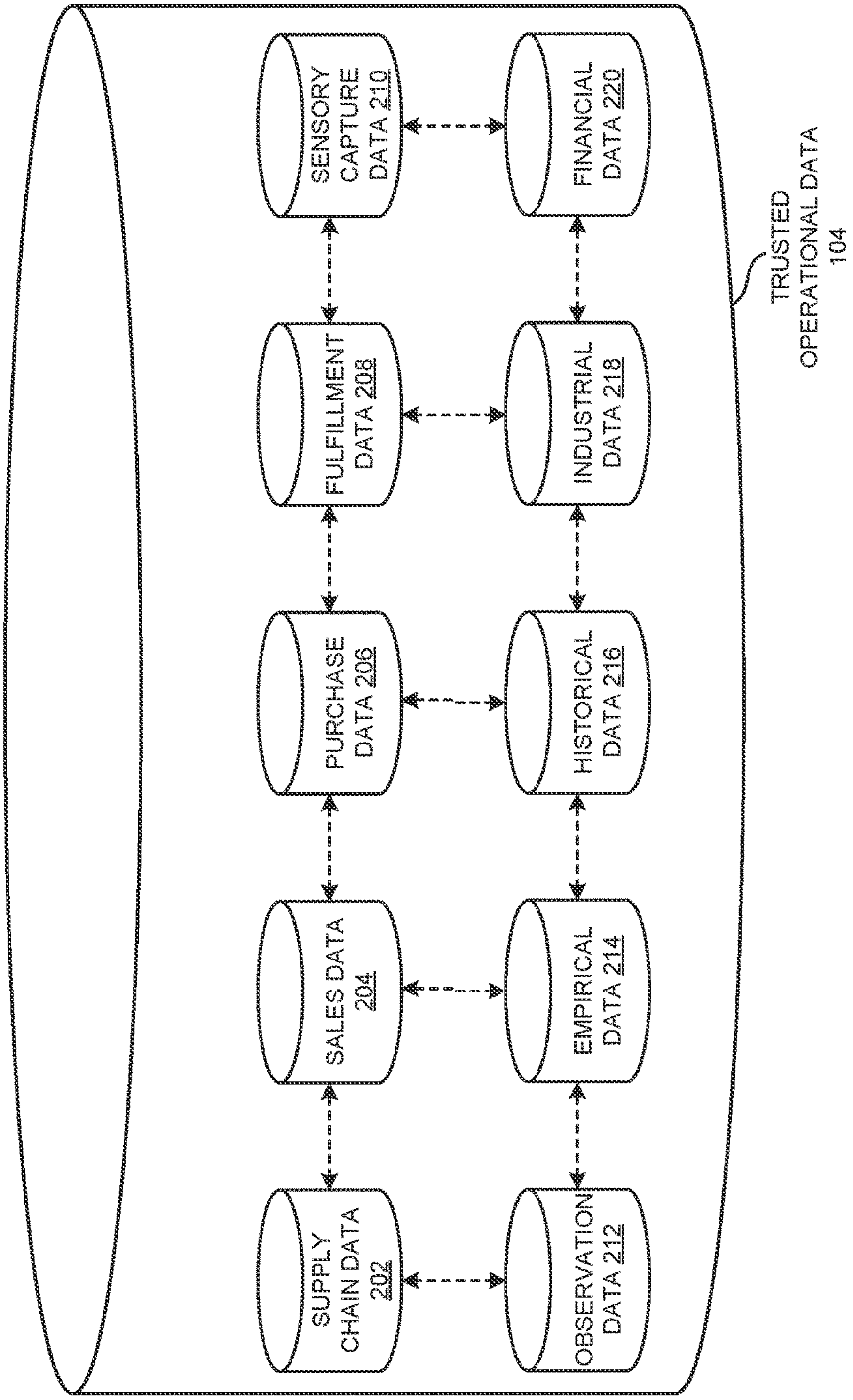
FIG. 2 is an exploded view of data stored within the trusted operational data, according to one embodiment.

FIG. 1 is a diagnostic system 150 of a diagnostic model 102 communicatively coupled with a processing system 106A-N and a trusted operational data 104, according to one embodiment. FIG. 1 shows a diagnostic model 102, a trusted operational data 104, a processing system(s) 106, and a network 108. The diagnostic model 102 may utilize a machine learning algorithm to generate a diagnostic model 102 which can be applied to determine a root cause in scenarios when there may be a mistake identified in an output of an operating machine learning model, such as the evaluated model 302 of FIG. 3. The trusted operational data 104 may be business data that may be deemed reliable by a business. Examples of the trusted operational data 104 are shown in FIG. 2. The processing system(s) 106 may be computing devices capable of performing machine learning operations, according to one embodiment. The network 108 may be a wide area network that enables the diagnostic model 102 to communicate with the processing system(s) 106 and the trusted operational data 104.

The diagnostic model 102 may be taught through machine learning algorithm to recognize patterns, make predictions, or perform tasks related to identifying causes of future mistakes based on the provided data.

FIG. 1 also shows two operations. In circle '1', the diagnostic model 102 may be trained using trusted operational data 104 by performing machine learning operations using the processing systems(s) 106, according to one embodiment. In circle '2', the diagnostic model 102 may be formed when the trusted operational data 104 is injected into the diagnostic model 102, according to one embodiment.

FIG. 2 is an exploded view of data stored within the trusted operational data 104 of FIG. 1, according to one embodiment. The trusted operational data 104 may be a supply chain data 202, a sales data 204, a purchase data 206, a fulfillment data 208, a sensory capture data 210, an observation data 212, an empirical data 214, a historical data 216, an industrial data 218, and/or a financial data 220. The supply chain data 202 may be information about actual sales, actual stock of inventory, known returns, etc. The purchase data 206 may be information that describes what was purchased by customers in a business. The fulfillment data 208 may describe shipments made of products sent to a customer. The sensory capture data 210 may be information recorded from sensors such as temperature, heat, cameras, and other sensors measuring an ambient environment according to one embodiment. The observation data 212 may be information that may be observed but known to be reliable according to one embodiment. The empirical data 214 may be tested data that may be observed but confirmed by scientific methods, according to one embodiment. The historical data 216 may be information of past records maintained by a business, according to one embodiment. Industrial data 218 may describe information that may be known based on factory planning or factory systems according to one embodiment. The financial data 220 may be data stored in an enterprise resource planning system of a business according to one embodiment.

Figure 3:
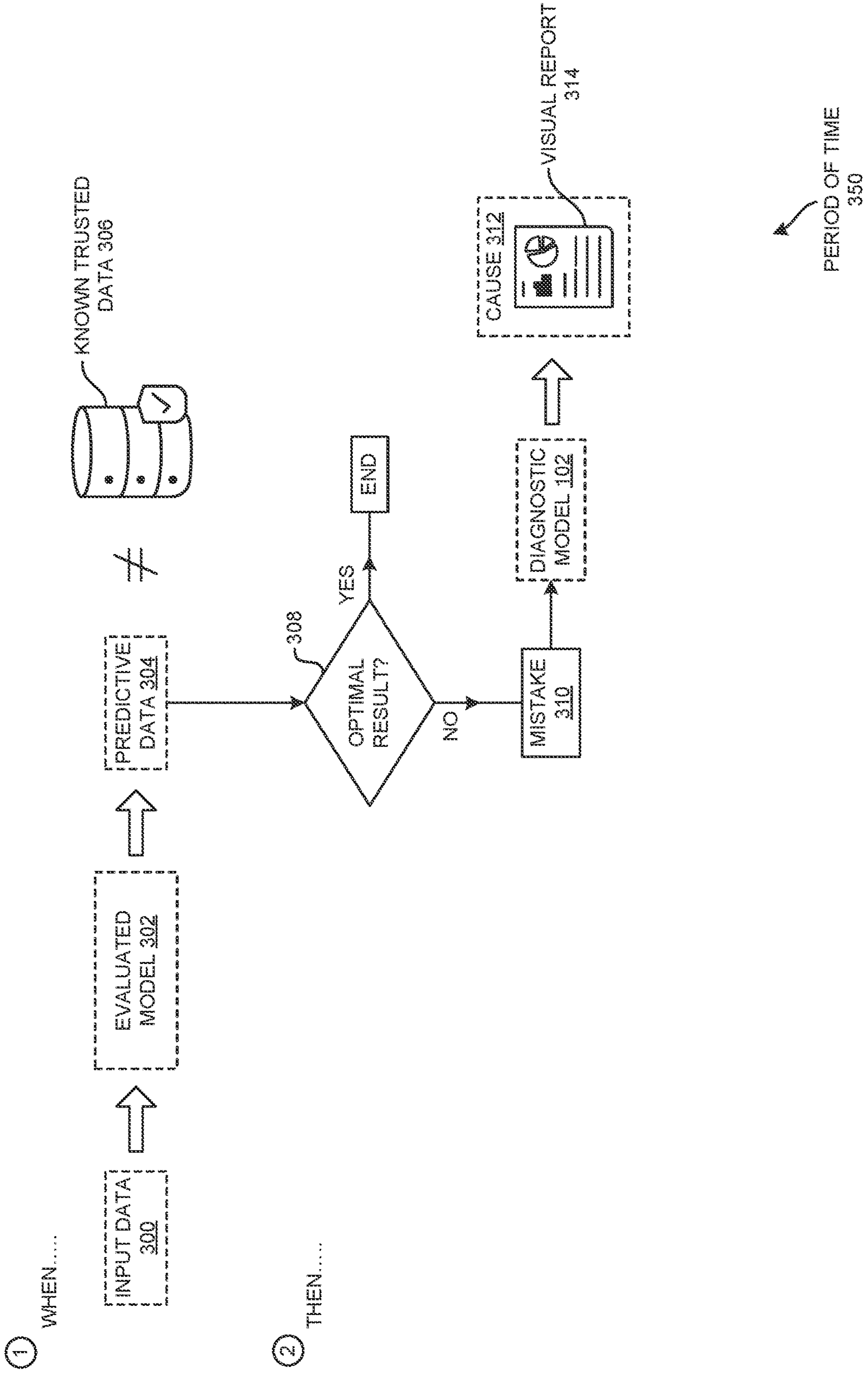
FIG. 3 a time-based view of a period of time in which non-optimal results of a machine learning model are passed through the diagnostic model to determine a cause of a mistake, according to one embodiment.

FIG. 3 a time-based view of a period of time in which non-optimal results of a machine learning model are passed through the diagnostic model to determine a cause of a mistake, according to one embodiment. FIG. 3 shows an input data 300, an evaluated model 302, a predictive data 304, a known trusted data 306, an optimal result dialogue 308, a mistake indicator 310, and a cause 312 determined when the diagnostic model 102 is applied, and a visual report 314. In FIG. 3, as illustrated in 'circle 1', input data 300 may be provided to the evaluated model 302. The evaluated model 302 may be a machine learning model (supervised learning, unsupervised learning, and reinforcement learning) for a particular use case.

Embodiments of FIG. 3 may used to predict mistakes in evaluated models 302 in the following use cases, according to one embodiment:

Image recognition such as facial recognition, object detection, and self-driving cars may deploy the diagnostic model 102 of FIG. 1 to detect and analyze incorrect persons, reasons that objects were misidentified, reasons machine learning detected false obstructions in self-driving systems, and more according to one embodiment. This can save lives, protect personal privacy, reduce visual bias, and/or prevent future accidents when the diagnostic model 102 of FIG. 1 is deployed.

Natural language processing (NLP) such as the ability to understand and process human language in use cases such as spam filtering, machine translation, and/or question answering may deploy the diagnostic model 102 of FIG. 1 to detect and analyze mistakes and causes of the mistakes when important documents are accidentally flagged as spam, and when intended meanings are mis translated. This can reduce fraud and/or increase productivity when the diagnostic model 102 of FIG. 1 is deployed.

Speech recognition such as voice assistants, dictation software, and/or call centers may deploy the diagnostic model 102 of FIG. 1 to detect and analyze mistakes and causes of the mistake when people perceive a different voice than a simulated voice artificial intelligence, when accents generated by artificial intelligence are not perceived to be genuine. This can help those with speech impediments speak more naturally to others so that they are understood without being discriminated against, when the diagnostic model 102 of FIG. 1 is deployed.

Fraud detection to detect fraud machine learning models that identify patterns that humans might not be able to perceive may deploy the diagnostic model 102 of FIG. 1 to detect and/or analyze mistakes and/or causes of the mistakes if an actual fraudulent event was not detected. This can reduce crime and/or prevent financial losses when the diagnostic model 102 of FIG. 1 is deployed.

Recommendation systems to recommend products, services, or content to users may deploy the diagnostic model 102 of FIG. 1. The embodiments of the diagnostic model 102 may be used to detect and state the cause of reasons of improper recommendations and thereby improve satisfactions of users of various software and/or on-demand services (e.g., video streaming services), according to the embodiments described herein with respect to the diagnostic model 102.

Predictive analytics to predict future events may use the diagnostic model 102 of FIG. 1 to detect and/or state the cause of reasons why forecasts were inaccurate, why demand did not materialize, and/or what can be done to avoid mistakes in the future. When the diagnostic model 102 is utilized, businesses may be able to make better decisions about a wide variety of things, such as product pricing, customer churn, and/or risk management by understanding root causes of mistakes in machine learning models to make accurate predictions about the future.

The evaluated model 302 may create the predictive data 304A (e.g. a simulated data, which is the output of the evaluated model 302) in response to the input data 300. Predictive data 304 may be produced from different input data 300 such as stock price prediction data, inventory prediction data, risk assessment data, or customer churn data, according to one embodiment. When the predictive data 304 is not the same as the known trusted data 306 (e.g., a new sales actuals data that later comes in), then the embodiments described in FIGS. 1-16 determine whether the predictive data 304 is an optimal result of the evaluated model 302. If the predictive data 304 is an optimal result, no further action is taken and the diagnostic model 102 is not applied according to the embodiment of FIG. 3. However, when the system determines that the predictive data 304 is not the optimal result of the evaluated model 302, then, as illustrated in 'circle 2', a mistake 310 may be identified by the diagnostic model 102. By using the diagnostic model 102, a cause 312 of the mistake 310 may be identified. This cause 312 can be presented as a visual report 314.

A cause 312 of the mistake 310 may be explained using the diagnostic model 102. The method determines that a predictive data 304 produced by an evaluated model 302 for a period of time 350 does not match a known trusted data 306 for the period of time 350. The method analyzes whether the predictive data 304 produced by the evaluated model 302 for the period of time 350 is an optimal result of the evaluated model 302. A determination may be made that a mistake 310 occurred when the predictive data 304 is not the optimal result of the evaluated model 302. The method may compare the predictive data 304 of the evaluated model 302 with a predictive data 304A (e.g. a simulated data, which is the output of the evaluated model 302) of the diagnostic model 102 when the mistake 310 is observed to explain the cause 312 of the mistake 310 using the diagnostic model 102.

The method may further determine the cause 312 of the mistake 310 may be because of concept drift in a relationship between an input data 300 and the predictive data 304 caused because a property of a target variable has changed over time. The method may further determine the cause 312 of the mistake 310 may be because the evaluated model 302 is underfitted because while a similar input data 300 to an input data 300 happened in the past, the evaluated model 302 was not sufficiently fitted to the input data 300. The method may further determine the cause 312 of the mistake 310 may be because the evaluated model 302 is overfitted because the diagnosed evaluated model 302 may be unable to generalize away from a narrow band of deep optimizations to extrapolate to a general case.

The method may further determine the cause 312 of the mistake 310 may be because the evaluated model 302 is based on an anomaly meaning that normally the evaluated model 302 would be correct and that a human decision maker would most likely make the same mistake in this special case because of a unique condition of an input data 300 now received and this mistake may be caused by a non-determinism of a problem. The method may further determine the cause 312 of the mistake 310 may be because an input data 300 to the evaluated model 302 is based on an intentional attack caused by malignant actors attempting to undermine an integrity of the evaluated model 302 and this intentional attack may be an intentional modification of the input data 300 to the model.

The method may further determine the cause 312 of the mistake 310 and a corresponding fix recommendation, which suggests how to improve performance of the evaluated model 302. The method may then generate a visual report 314 emphasizing a ranked set of important findings based on an order of importance, which may comprise relevant statistics related to the evaluated model 302, the quality of its approximator, and the distributions of a diagnostic attribute. Furthermore, the visual report 314 may include an interactive plot to help to explore diagnoses for individual instances and analyze their statistics for specific groups. The visual report 314 may provide insights on the importance of original attributes, approximated by significance of attributes in the diagnostic model 102.

The method may further base a surrogate evaluated model on the trusted operational data 104 produced by the evaluated model 302, automatically apply a method of discretization, apply an algorithm to determine high-quality approximations, obtain trusted neighborhoods of each current instance by looking for trusted instances that were processed in a similar way by the surrogate evaluated model, and train the surrogate model as the approximator of the evaluated model.

In an alternate embodiment, an additional model may be used to train the diagnostic module 102, called the "global diagnostic model". The global diagnostic model may be pre-trained on multiple historical prediction problems and related diagnostic data (values of diagnostic attributes associated with those historic prediction models diagnosed in the past). This global diagnostic model may classify the new diagnosed model (as a whole) into one of three categories (underfit, overfit, regular fit). This classification may later used by our diagnostic algorithm to assign diagnoses to particular samples (errors made by the diagnosed model).

The method may further specify diagnostic attributes that can be derived from contents of computed neighborhoods through analyzing the specific neighborhood to determine characteristics and through determination of the set of characteristics. The method may further provide meaningful information on model operations by including the set of characteristics as diagnostic attributes that constitute an input in diagnostic rules and may link values of the diagnostic attributes to a set of possible causes of mistakes. Furthermore, when a neighborhood of a particular current instance is in at least one of a null and a minimal condition, then a probable cause of the mistake 310 of the evaluated model 302 on the particular current instance may be that this is a totally new dissimilar case to historic cases and the evaluated model 302 was unprepared for such cases.

Figure 4:
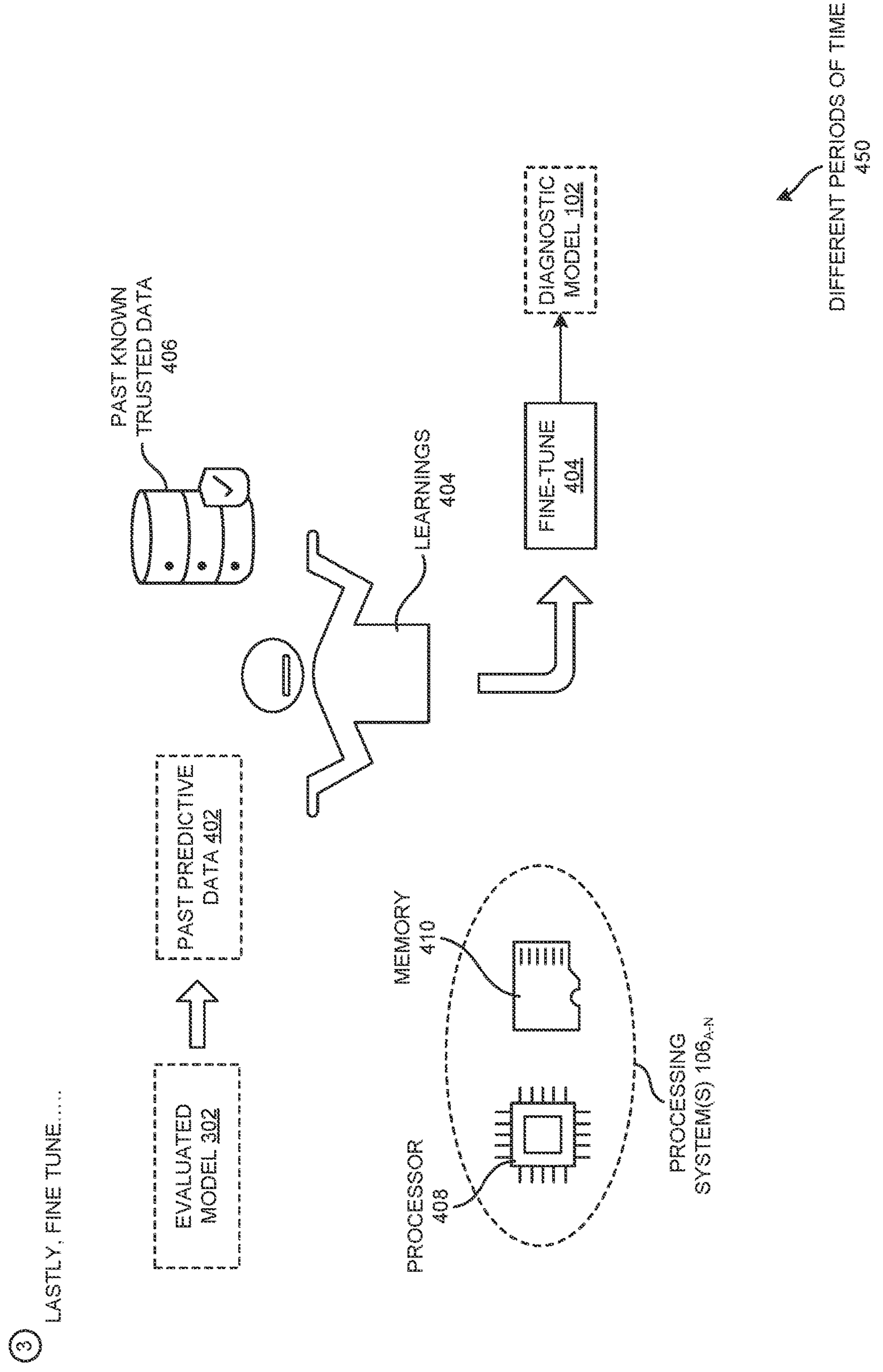
FIG. 4 is a time-based view of a different period of time from the period of time of FIG. 3 in which past predictive data of the evaluated model may be compared with a past known trusted data to fine tune the diagnostic model, according to one embodiment.

FIG. 4 is a time-based view of a different period of time from the period of time of FIG. 3 in which past predictive data 402 of the evaluated model is compared with a past known trusted data 406 to fine tune 404 the diagnostic model 102, according to one embodiment. FIG. 4 shows a past predictive data 402 compared with past known trusted data 406 to form a set of learnings 404. The learnings 404 may be used to fine tune 404 the diagnostic model 102 as illustrated in FIG. 4 using the processor 408 and memory 410 of the processing system 106. Lastly, fine-tuning the diagnostic model 102 (e.g., a fine tune operation 404) is performed based on learnings 404 from a past predictive data 402 for different periods of time 450 when compared with past known trusted data 406 for the different periods of time 450 using at least one processor 408 and a memory 410 of the processing system(s) 106A-N. Past predictive 402 data may be historical data that contains both the input features and the corresponding target variable or outcome.

The method may further form the diagnostic model 102 based on the trusted operational data 104 and the past predictive data 402 for different periods of time 450 when compared with past known trusted data 406 for the different periods of time 450 using rough set-based models in which intelligent systems may be characterized by insufficient and incomplete information. The method may further compute accurate approximations of past predictive data 402 with rough set-based surrogate models and a heuristic optimization method.

Figure 5:
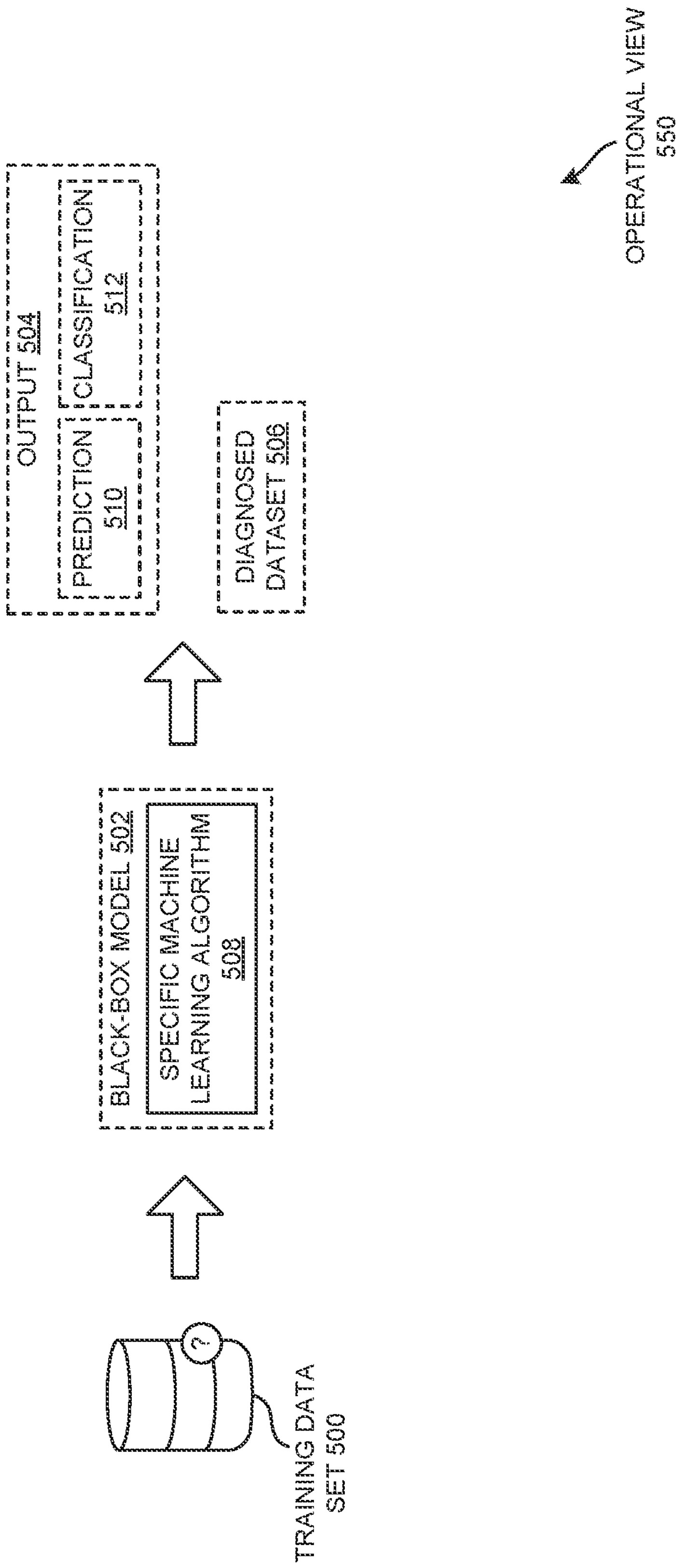
FIG. 5 is an operational view of utilizing the diagnostic model on a black-box model for whom a specific machine learning algorithm may be unknown, and for whom a training data set that formed the black-box model may be inaccessible to the diagnostic model, according to one embodiment.

FIG. 5 is an operational view 550 of utilizing the diagnostic model 102 on a black-box model 502 for whom a specific machine learning algorithm 508 may be unknown, and for whom a training data set 500 that formed the black-box model 502 may be inaccessible to the diagnostic model 102, according to one embodiment. Explaining the cause 312 of the mistake 310 may be applied to diagnose a black-box model 502 without requiring any knowledge about technical specifications of a specific machine learning algorithm 508 of the black-box model 502 and without having direct access to it. The diagnostic model 102 may be applied on a diagnosed dataset 506 and an output 504 of the evaluated model 302 comprising at least one of a prediction 510 and a classification, without using predictions (e.g., prediction 510) on a training data set 500.

The method may generate a most probable explanation of the cause 312 of the mistake 310 as a natural language text. The method may further determine the cause 312 of the mistake 310 may be because a labeling of a historical training data set 500 on which the evaluated model 302 was formed was erroneous. The method may further determine the cause 312 of the mistake 310 may be because an external condition changed which caused the predictive data 304 produced by the evaluated model 302 to no longer conform to predictive trends. The method may further determine the cause 312 of the mistake 310 may be because of an error in an input data 300 to the evaluated model 302 which may be caused by any one of an inaccurate sensor reading, a human error, and an anomaly. The method may further determine the cause 312 of the mistake 310 may be because an input data 300 is a novel scenario from previous input scenarios, and the evaluated model 302 may be unprepared in the novel scenario.

The training data set 500 may be a labeled set of data examples that may be used to train the evaluated model 302 and may comprise input data (features) and corresponding output labels or target variables, according to one embodiment. The black-box model 502 may be deep neural networks, ensemble methods like random forests or gradient boosting, support vector machines (SVMs), or other sophisticated algorithms that may be designed to capture intricate patterns and relationships in the data that may be challenging to interpret due to their complex structures and high dimensionality, according to one embodiment. The diagnosed dataset 506 may be a dataset that is labeled or annotated with diagnoses or labels related to a particular domain or problem, according to one embodiment.

The method may further generate reports containing relevant statistics related to the diagnostic model, the quality of its approximator, and the distributions of diagnostic attributes. Furthermore, the diagnostic model 102 may be a system that is responsible for making a diagnosis of causes of errors made by the evaluated model 302 that is being diagnosed and whose prediction 510 is already a concrete cause of error, and the approximator may be encapsulated within the diagnostic model 102 comprising of an ensemble of rough-set models for determining approximations and neighborhoods.

The method may further generate interactive plots to explore diagnoses for individual instances and analyze their statistics for specific groups. The method may further determine the importance of original attributes, approximated by the significance of attributes in the diagnostic model 102, and the diagnostic model 102 may be a surrogate model. The method may further generate a set of historical neighborhoods comprising a set of historical instances that were processed in a similar way to the current instance on which mistakes of the diagnosed evaluated model 302 may be observable. The method may further form a set of diagnostic attributes which describe a current instance through analysis of contents of the historical neighborhoods. The method may form the diagnostic model 102 as a decision model which obtains vectors of the set of diagnostic attributes as an input data 300 and deliver a most probable cause of the mistake 310 as an output 504 data of the diagnostic model 102. The method may further form the diagnostic model 102 based on an analysis of mistakes registered in the set of neighborhoods.

The method may further obtain a set of neighborhoods using the model approximator comprising an ensemble of approximate reducts known from the theory of rough sets and determine a specific neighborhood of a diagnosed instance through a decision process of the model approximator, wherein the neighborhood for a diagnosed instance relative to a single reduct is a subset of instances from the historical training dataset which belong to the same indiscernibility class. The final neighborhood may be the sum of neighborhoods computed for all reducts in the ensemble. The instances from neighborhoods may have weights that express how representative they may be for a given neighborhood.

The method may further approximate how many reducts in the ensemble of approximate reducts may be able to process in a same way a given pair of instances, count how many reducts the given pair of instances of the ensemble may be processed in the same way, and determine a similarity measure between instances through the counting of how many reducts in the ensemble the given pair of instances may be processed in the same way. The method may further analyze the specific neighborhood to determine characteristics comprising at least one of consistency of ground truth labels, consistency of original model predictions (e.g., prediction 510), consistency of approximations, neighborhood size, and uncertainty of predictions (e.g., prediction 510). The method may then determine a set of characteristics through analyzing the specific neighborhood to determine consistency of labels comprising at least one of ground truth labels, original model predictions (e.g., prediction 510), approximations, size, and uncertainty of predictions (e.g., prediction 510).

Figure 6:
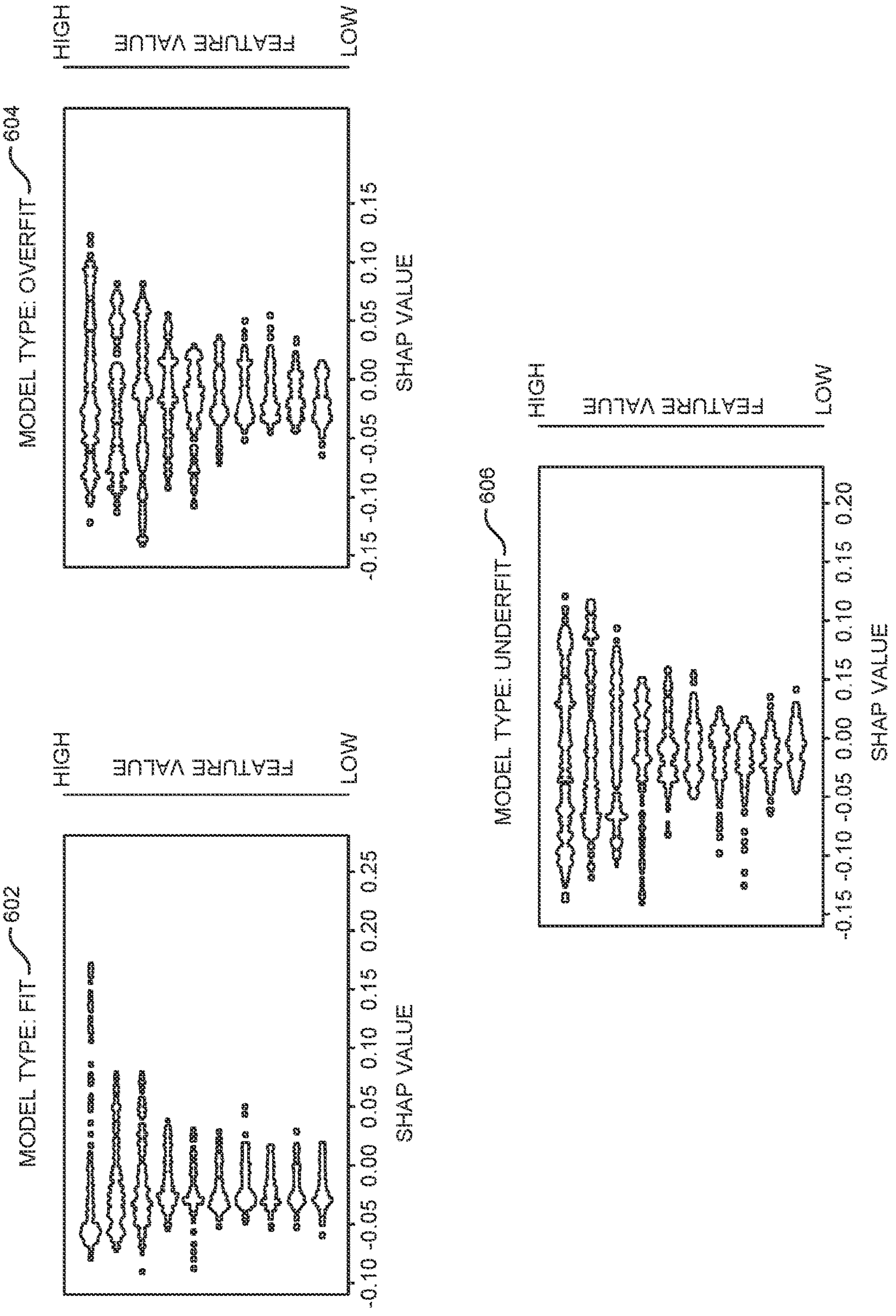
FIG. 6 is a graphical representation showing a fitted model, an overfitted model, and an underfitted model as determined by the diagnostic model as the cause of the mistake, according to one embodiment.

FIG. 6 is a graphical representation showing a fitted model 602, an overfitted model 604, and an underfitted model 606 as determined by the diagnostic model as the cause of the mistake, according to one embodiment. The fitted model 602 may be a model that has learned patterns and relationships from a given training dataset, according to one embodiment. The overfitted model 604 may be a model that has learned the training data too well, to the point that it performs poorly on new, unseen data and may occur when a model becomes too complex or captures noise and random variations in the training data, leading to an inability to generalize well to unseen examples, according to one embodiment. The underfitted model 606 may be a model that has not learned the underlying patterns and relationships in the training data adequately and may be characterized by poor performance not only on the training data but also on new, unseen data, resulting in a failure to capture the complexity of the data which may result in high bias, according to one embodiment.

Figure 7:
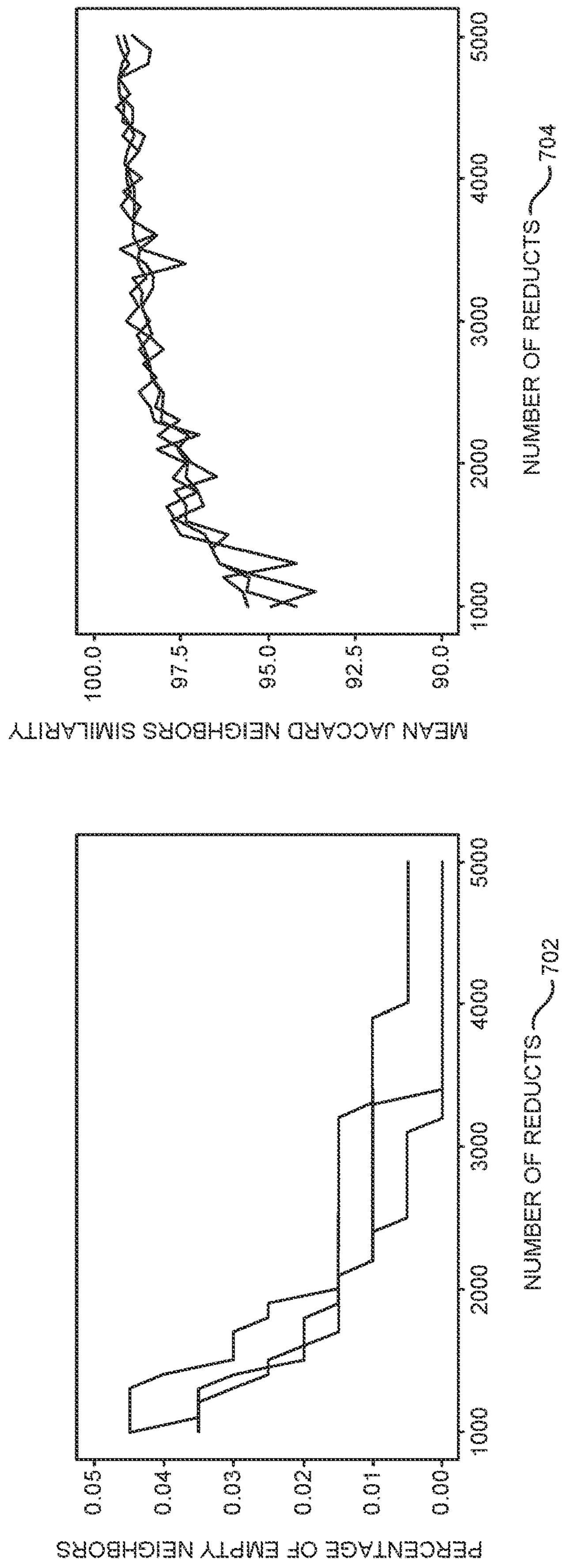
FIG. 7 is a graphical process flow showing a number of reducts verses empty neighbors and percentage of neighbor similarity as the number of reducts increase, according to one embodiment.
Figure 8:
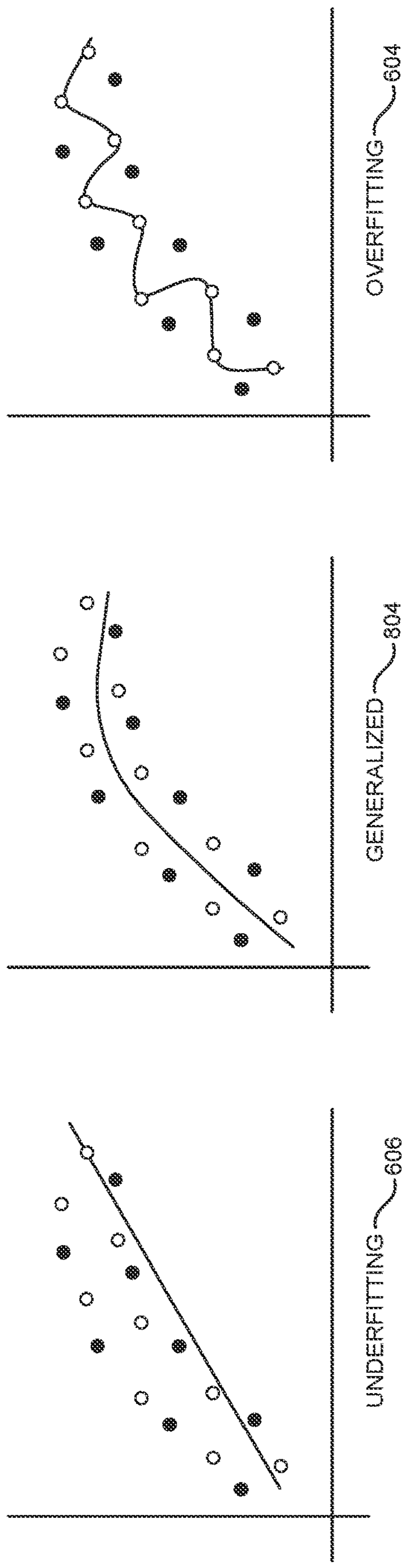
FIG. 8 is a histogram showing an underfitted model, a generalized model, and an overfitted model as determined by the diagnostic model as the cause of the mistake, according to one embodiment.

FIG. 7 is a graphical process flow showing a number of reducts verses empty neighbors 702 and percentage of neighbor similarity as the number of reducts increase 704, according to one embodiment. Reducts may be a subset of features or attributes that preserves the ability of a machine learning model to discriminate or classify instances with the same accuracy as using the complete set of features, according to one embodiment. Empty neighborhoods may occur in clustering algorithms when certain regions or areas of the data space do not contain any data points or instances and these empty regions may indicate a lack of data points that belong to a particular cluster or group, according to one embodiment. FIG. 8 is a histogram showing an underfitted model 606, a generalized model 804, and an overfitted model 806 as determined by the diagnostic model as the cause of the mistake, according to one embodiment. The generalized model 804 may be a model that has learned patterns and relationships from the training data in such a way that it may make accurate predictions or perform well on unseen or new data and may apply the knowledge it has learned from the training data to previously unseen examples, according to one embodiment.

Figure 9:
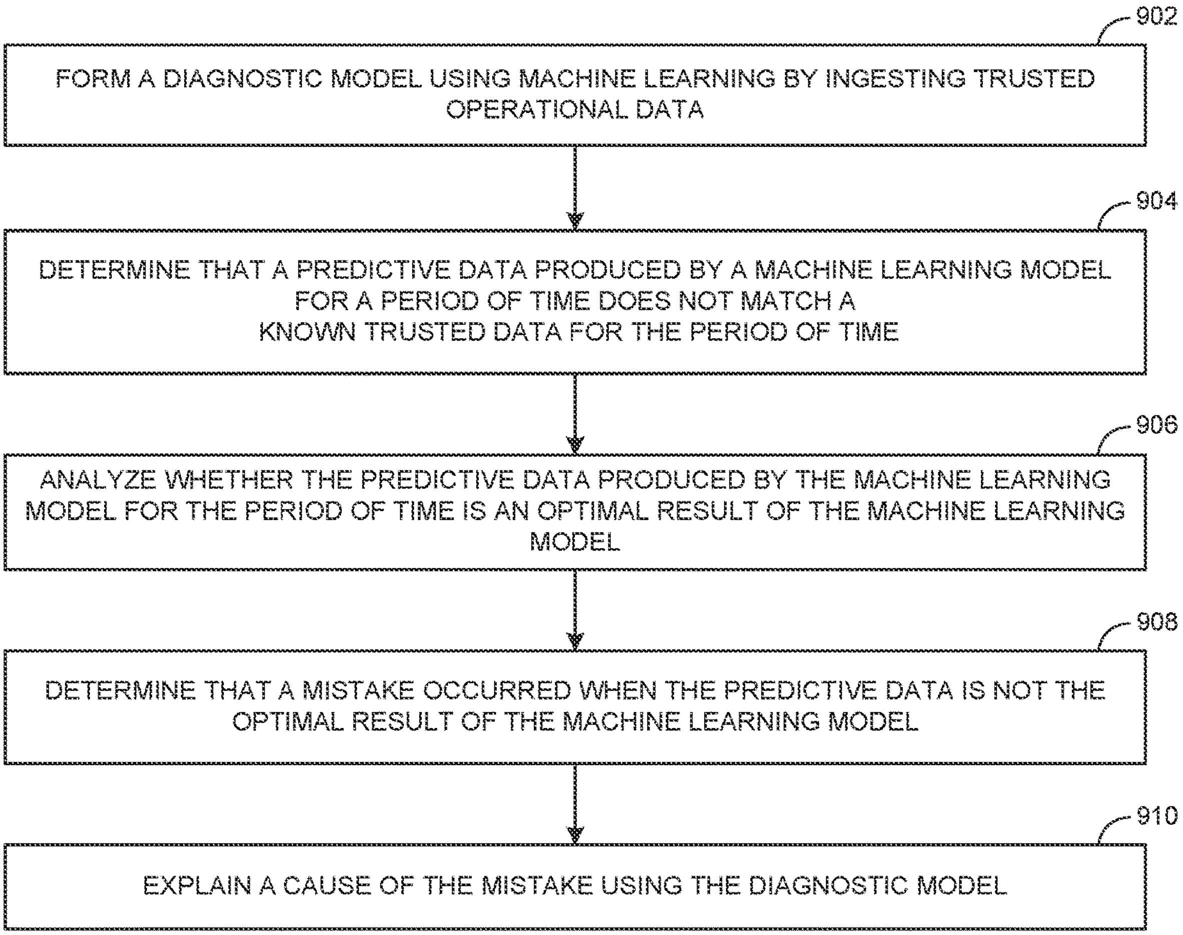
FIG. 9 is a process flow diagram in which a cause of the mistake of the machine learning model may be determined using the diagnostic model, according to one embodiment.

FIG. 9 is a process flow diagram in which a cause 312 of the mistake 110 of the evaluated model 302 may be determined using the diagnostic model 102, according to one embodiment. In operation 902, a diagnostic model 102 may be formed using machine learning by ingesting trusted operational data 104 (as shown in FIG. 1), according to one embodiment. Then, in operation 904, it may be determined that a predictive data 304 produced by an evaluated model 302 for a period of time does not match a known trusted data 306 for the period of time 350. Next, in operation 906, an analysis may be done to determine whether the predictive data 304 produced by the evaluated model 302 for the period of time 350 is an optimal result of the evaluated model 302. In operation 908, it may be determined that a mistake 310 occurred when the predictive data 304 is not the optimal result of the evaluated model 302. In operation 910, a cause 312 of the mistake 310 may be explained using the diagnostic model 102.

Figure 10:
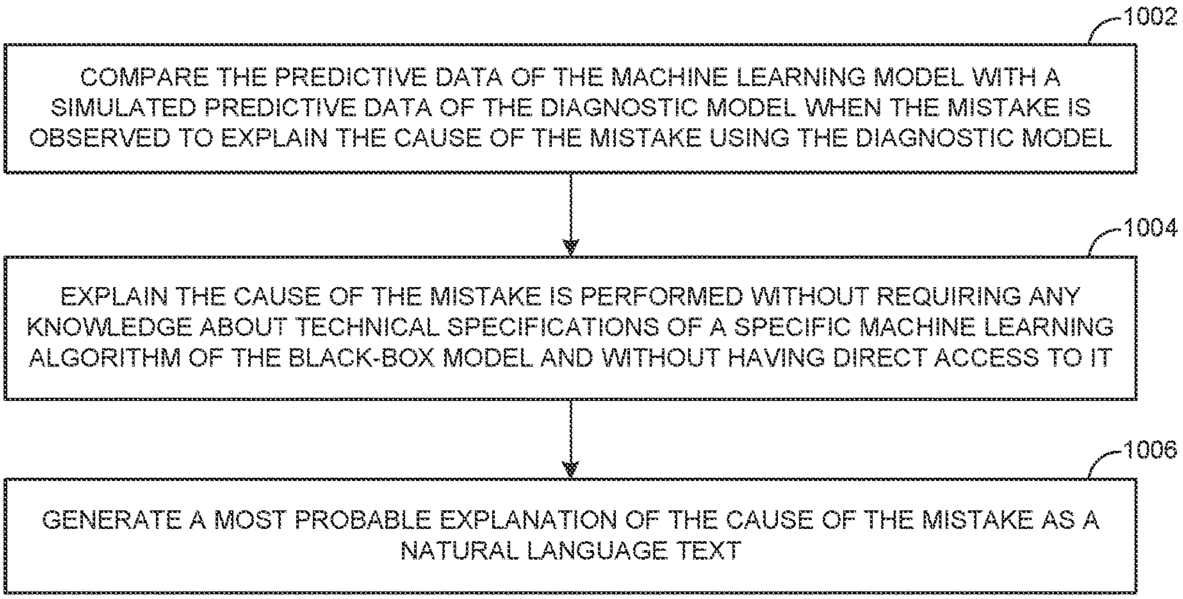
FIG. 10 is a process flow in which a most probable explanation of a cause of the mistake may be presented as a natural language text, according to one embodiment.

FIG. 10 is a process flow diagram in which a most probable explanation of a cause 312 of the mistake 310 may be presented as a natural language text, according to one embodiment. In operation 1002, the predictive data 304 of the evaluated model 302 may be compared with a predictive data 304A (e.g. a simulated data, which is the output of the surrogate model) of the diagnostic model 102 when the mistake 310 is observed to explain the cause 312 of the mistake 310 using the diagnostic model 102. In operation 1004, a cause 312 of the mistake 310 may be explained without requiring any knowledge about the technical specifications of a specific machine learning algorithm of the black box model and without having direct access to it. Then in operation 1006, a most probable explanation of the cause 312 of the mistake 310 may be generated as a natural language text.

Figure 14:
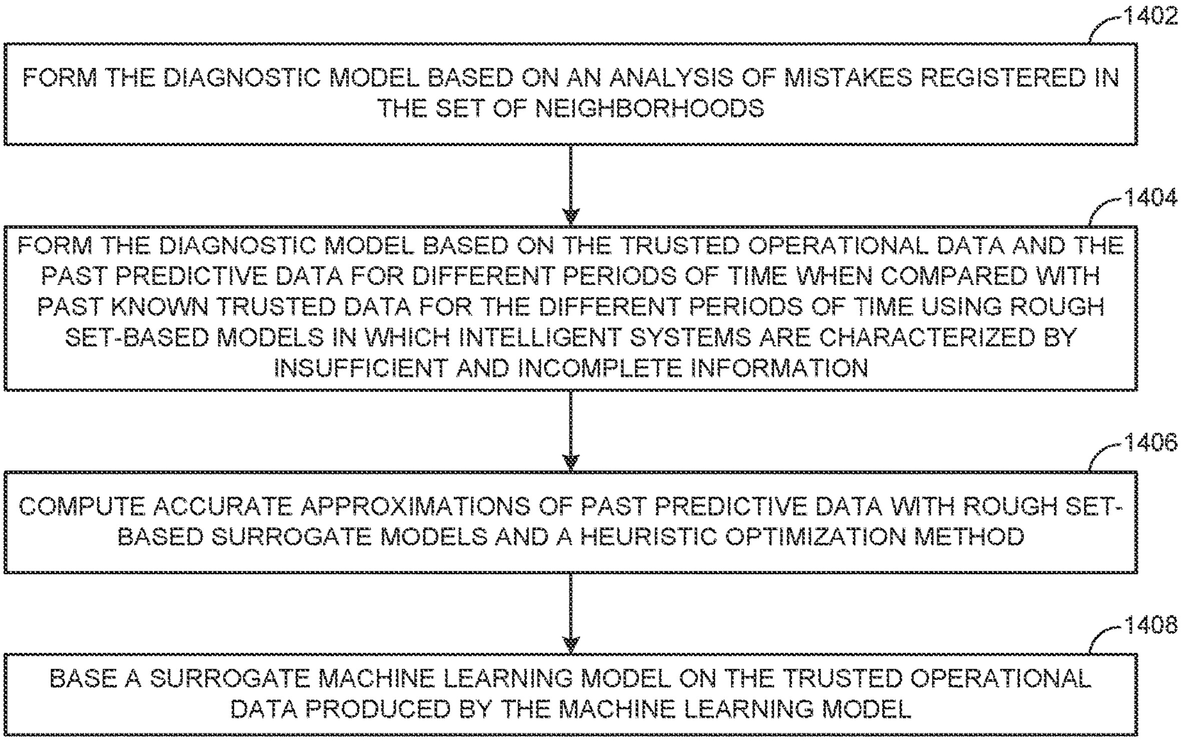

FIG. 10 may be better understood in conjunction with review of FIG. 14. FIG. 14 is a process flow diagram in which the diagnostic model 102 may be formed and used to create a surrogate machine learning model, according to one embodiment. In operation 1402, the diagnostic model 102 may be formed based on an analysis of mistakes 310 registered in the set of neighborhoods. In operation 1404, the diagnostic model 102 may be formed based on the trusted operational data 104 and the past predictive data 402 for different periods of time 450 when compared with past known trusted data 406 for the different periods of time 450 using rough set-based models in which intelligent systems may be characterized by insufficient and incomplete information. In operation 1406, the diagnostic model 102 computes accurate approximations of past predictive data 402 with rough set-based surrogate models and a heuristic optimization method. In operation 1408, a surrogate machine learning model may be based on the trusted operational data 104 produced by the evaluated model.

Figure 11:
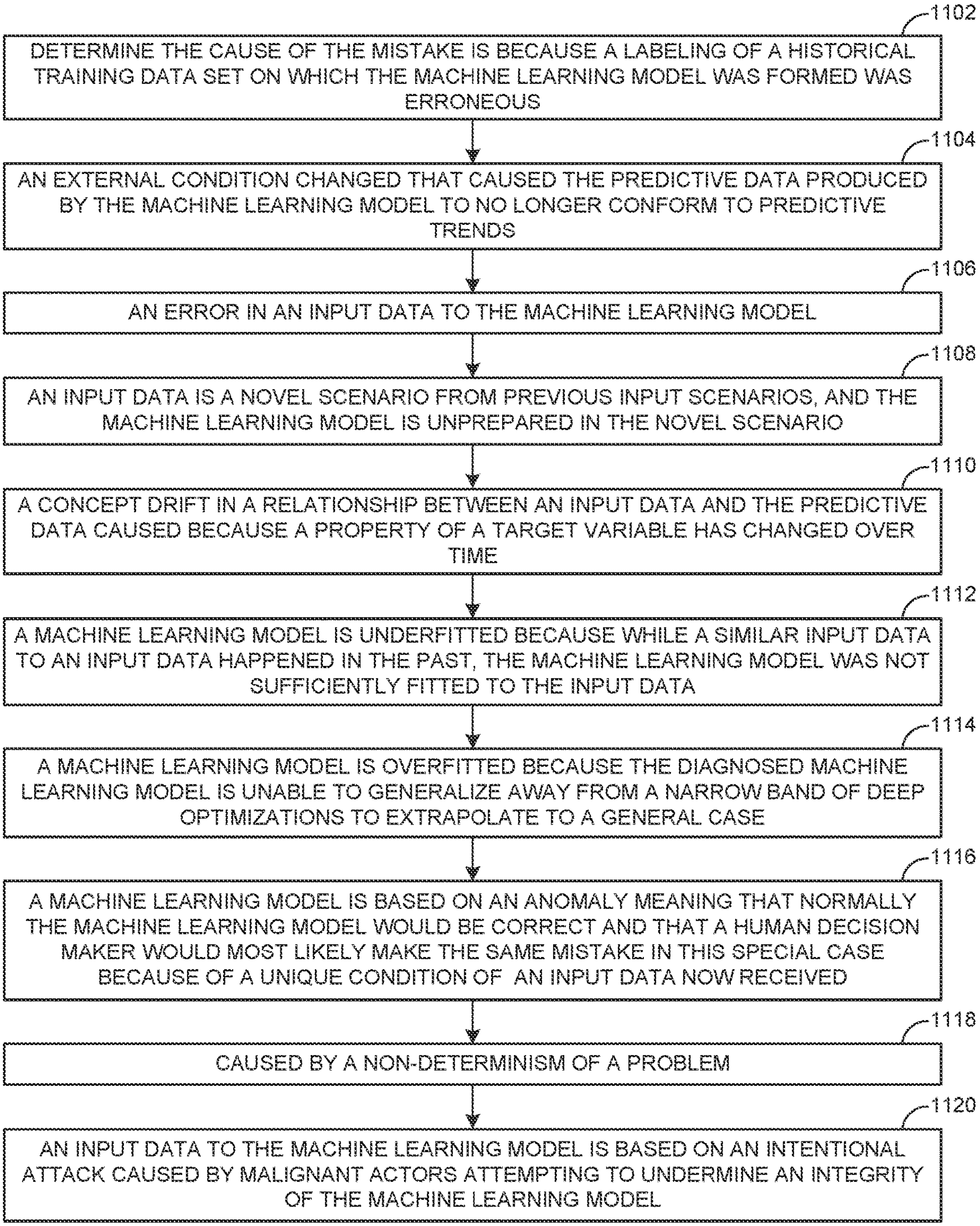
FIG. 11 is a process flow diagram in which a cause of the mistake may be determined by the diagnostic model, according to one embodiment.

FIG. 11 is a process flow diagram in which a cause 312 of the mistake 310 may be determined by the diagnostic model 102, according to one embodiment. In operation 1102, the diagnostic model 102 determines whether the cause 312 of the mistake 310 was because the labeling of a historical training data set on which the evaluated model was formed was erroneous. In operation 1104, the diagnostic model 102 determines whether the cause 312 of the mistake 310 was that an external condition changed that caused the predictive data produced by the evaluated model to no longer conform to predictive trends. In operation 1106, the diagnostic model 102 determines whether the cause 312 of the mistake 310 was an error in an input data to the evaluated model. In operation 1108, the diagnostic model 102 determines whether the cause 312 of the mistake 310 may be that the input data is a novel scenario from previous input scenarios, and the evaluated model may be unprepared in the novel scenario.

In operation 1110, the diagnostic model 102 determines whether the cause 312 of the mistake 310 was a concept drift in a relationship between an input data and the predictive data caused because a property of a target variable has changed over time. In operation 1112, the diagnostic model 102 determines whether the cause 312 of the mistake 310 was because the evaluated model may be underfitted because while a similar input data to an input data happened in the past, the evaluated model was not sufficiently fitted to the input data. In operation 1114, the diagnostic model 102 determines whether the cause 312 of the mistake 310 was because the evaluated model may be overfitted because the diagnosed machine learning model is unable to generalize away from a narrow band of deep optimizations to extrapolate to a general case.

In operation 1116, the diagnostic model 102 determines whether the cause 312 of the mistake 310 was because the evaluated model may be based on an anomaly meaning that normally the evaluated model would be correct and that a human decision maker would most likely make the same mistake in this special case because of a unique condition of an input data now received. In operation 1118, the diagnostic model 102 determines whether the cause 312 of the mistake 310 was a non-determinism of a problem. In operation 1120, the diagnostic model 102 determines whether the cause 312 of the mistake 310 may be that the input data to the evaluated model is based on an intentional attack caused by malignant actors attempting to undermine an integrity of the evaluated model.

Figure 12:
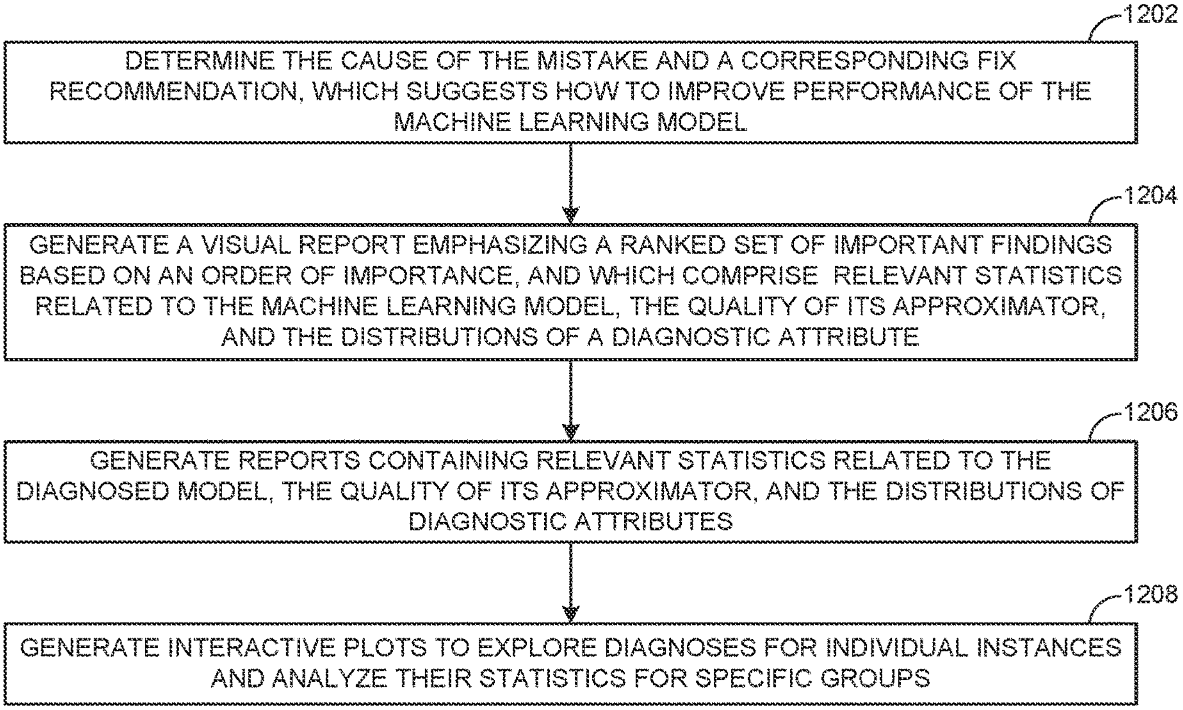
FIG. 12 is a process flow diagram in which interactive plots may be created to explore diagnoses for individual instances and analyze their statistics for specific groups, according to one embodiment.

FIG. 12 is a process flow diagram in which interactive plots may be created to explore diagnoses for individual instances and analyze their statistics for specific groups, according to one embodiment. In operation 1202, the cause 312 of the mistake 310 and a corresponding fix recommendation may be determined, which suggests how to improve performance of the evaluated model. In operation 1204, diagnostic model 102 generates a visual report emphasizing a ranked set of important findings based on an order of importance, and which comprise relevant statistics related to the evaluated model, the quality of its approximator, and the distributions of a diagnostic attribute. In operation 1206, the evaluated model 302 generates reports containing relevant statistics related to the diagnostic model, the quality of its approximator, and the distributions of diagnostic attributes. In operation 1208, the diagnostic model 102 generates interactive plots to explore diagnoses for individual instances and analyze their statistics for specific groups.

Figure 13:
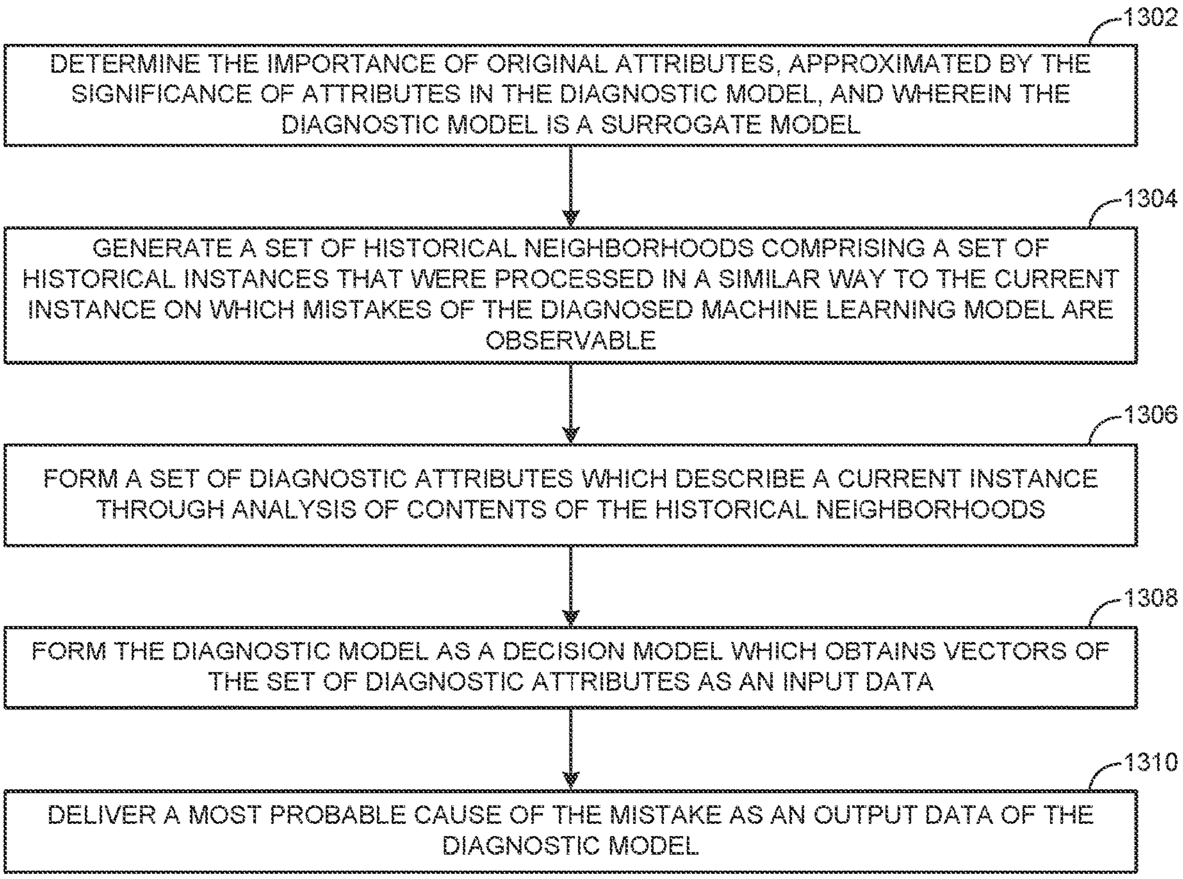
FIG. 13 is a process flow diagram in which historical neighborhoods may be used to deliver a most probable cause of the mistake as an output data of the diagnostic model, according to one embodiment.

FIG. 13 is a process flow diagram in which historical neighborhoods may be used to deliver a most probable cause 312 of the mistake 310 as an output data of the diagnostic model 102, according to one embodiment. In operation 1302, the diagnostic model 102 determines the importance of original attributes, approximated by the significance of attributes in the diagnostic model 102, and wherein the diagnostic model 102 may be a surrogate model to the evaluated model 302. In operation 1304, the diagnostic model 102 generates a set of historical neighborhoods comprising a set of historical instances that were processed in a similar way to the current instance on which mistakes of the diagnosed machine learning model may be observable.

The first, referred to in 1302, may be the surrogate model that approximates predictions of the evaluated model 302. The second, referred to in 1308, is a pre-trained model that takes as an input the values of diagnostic attributes and outputs something that may be called a global diagnosis. This diagnosis may then used to give the most probable causes of errors for individual historical data samples, according to one embodiment.

In operation 1306, the diagnostic model 102 forms a set of diagnostic attributes which describe a current instance through analysis of contents of the historical neighborhoods. In operation 1308, the diagnostic model 102 uses a pre-trained classification model as a decision model which obtains vectors of the set of diagnostic attributes as an input data. In operation 1310, the diagnostic model 102 delivers a most probable cause 312 of the mistake 310 as an output data of the diagnostic model 102.

Figure 15:
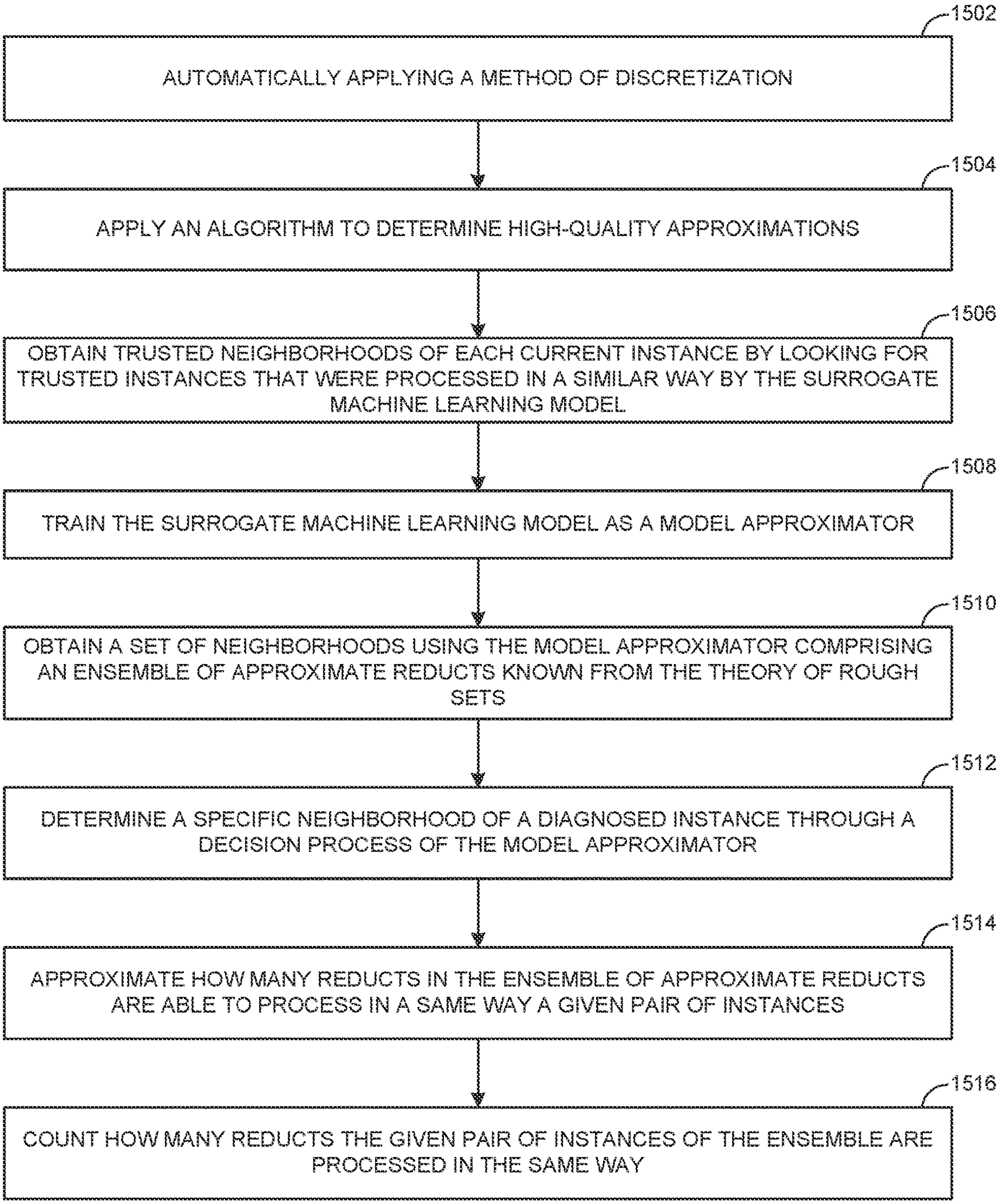
FIG. 15 is a process flow diagram in which the diagnostic model may be used to create a model approximator to approximate how many reducts a given pair of instances of an ensemble may be processed in the same way, according to one embodiment.

FIG. 15 is a process flow diagram in which the diagnostic model 102 may be used to create a model approximator to determine how many reducts a given pair of instances of an ensemble may be processed in the same way, according to one embodiment. In operation 1502, the diagnostic model 102 automatically applies a method of discretization. In operation 1504, the diagnostic model 102 applies an algorithm to determine high quality approximations. In operation 1506, the diagnostic model 102 obtains trusted neighborhoods of each current instance by looking for trusted instances that were processed in a similar way by the surrogate machine learning model. In operation 1508, the diagnostic model 102 trains the surrogate machine learning model as a model approximator. In operation 1510, the diagnostic model 102 obtains a set of neighborhoods using the model approximator comprising an ensemble of approximate reducts known from the theory of rough sets.

In operation 1512, the diagnostic model 102 determines a specific neighborhood of a diagnosed instance through a decision process of the model approximator. In operation 1514, the diagnostic model 102 approximates how many reducts in the ensemble of approximate reducts may be able to process in a same way a given pair of instances. In operation 1516, the diagnostic model 102 counts how many reducts the given pair of instances of the ensemble may be processed in the same way.

Figure 16:
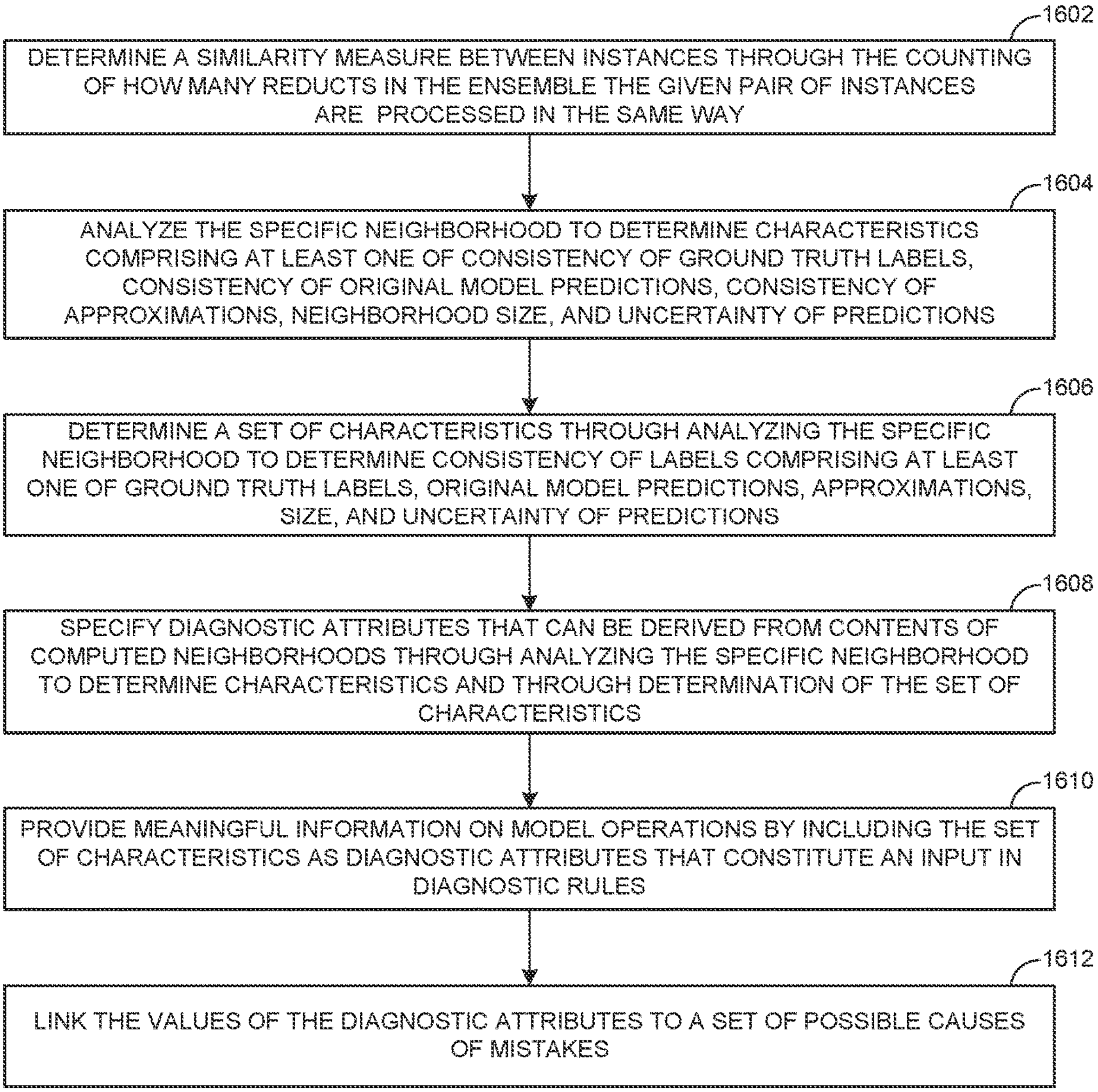
FIG. 16 is a process flow diagram in which the diagnostic model may be used to link the values of diagnostic attributes to a set of probable causes of the mistake(s), according to one embodiment.

FIG. 16 is a process flow diagram in which the diagnostic model 102 may be used to link the values of diagnostic attributes to a set of probable causes 312 of the mistake(s) 310, according to one embodiment. In operation 1602, the diagnostic model 102 determines a similarity measure between instances through the counting of how many reducts in the ensemble the given pair of instances may be processed in the same way. In operation 1604, the diagnostic model 102 analyzes the specific neighborhood to determine characteristics comprising at least one of consistency of ground truth labels, consistency of original model predictions, consistency of approximations, neighborhood size, and uncertainty of predictions.

In operation 1606, the diagnostic model 102 determines a set of characteristics through analyzing the specific neighborhood to determine consistency of labels comprising at least one of ground truth labels, original model predictions, approximations, size, and uncertainty of predictions. In operation 1608, the diagnostic model 102 specifies diagnostic attributes that can be derived from contents of computed neighborhoods through analyzing the specific neighborhood to determine characteristics and through determination of the set of characteristics. In operation 1610, the diagnostic model 102 provides meaningful information on model operations by including the set of characteristics as diagnostic attributes that constitute an input in diagnostic rules. In operation 1612, the diagnostic model 102 links the values of the diagnostic attributes to a set of possible causes of mistakes.

The various embodiments of FIGS. 1-16 describe a novel approach to investigating mistakes in machine learning model operations. The various embodiments of FIGS. 1-16 describe a diagnostic technology that can be used for analyzing prediction models and identifying model- and data-related issues. The idea of the embodiments of FIGS. 1-16 may be to generate surrogate rough set-based models from data that approximate decisions made by monitored black-box models. Such approximators may be used to compute neighborhoods of instances that undergo the diagnostic process—the neighborhoods may comprise of historical instances that were processed in a similar way by rough set-based models. The diagnostic process (as described in FIGS. 1-16 and as related to the diagnostic model 102) may be then based on the analysis of mistakes registered in such neighborhoods. The experiments performed on real-world datasets may confirm that such analysis may provide efficient and valid insights about the reasons for the poor performance of machine learning models.

As described in FIGS. 1-16, the various embodiments may not require knowledge about the diagnostic model nor direct access to it—the diagnosis may be performed based solely on the diagnosed data set and model's outputs (predictions, classifications, etc.) for that data. In the various embodiments of FIGS. 1-16, it may be important to assume access to the data set originally used to train the model, although predictions for that set may not be needed. These assumptions may be fulfilled in industrial environments where machine learning models may be deployed, which may make the presented approach in FIGS. 1-16 even more useful.

Oppositely, the rankings produced by the embodiments of FIGS. 1-16's rough set-based surrogate models can be regarded as estimations of the actual rankings for the diagnostic models in practice.

The embodiments of FIGS. 1-16 describe embodiments where diagnostic attributes may be permitted for distinguishing between correct and erroneous model predictions. Diagnostic attributes may be computed post-hoc, and may not need to be used to correct model predictions. However, embodiments of FIGS. 1-16 may check if they are descriptive enough to identify instances that were problematic for the model. The embodiments of FIGS. 1-16 may also verify that diagnostic attribute value distributions allow, according to the embodiments of FIGS. 1-16, the operations described to distinguish under-fitted and over-fitted models from the ones whose performance may be near-optimal for the given data. This ability may be important in many practical scenarios, not only in the ongoing model diagnostics but also e.g. at an earlier stage of choosing-machine learning solutions to be deployed in particular applications of embodiments FIGS. 1-16.

Surrogate Model Construction Procedure

The construction of our surrogate model in the embodiments of FIGS. 1-16 may require that all attributes have discrete values. Thus, the embodiments described herein may start with an approximation procedure by discretizing all numeric attributes using the quantile method—all resulting intervals may contain approximately the same number of instances. Then construct the ensemble of approximate reducts for instances from the data set may be constructed.

In the embodiments of FIGS. 1-16, the construction of the approximator may depend on the selection of two hyper-parameters: an E may represent the approximation threshold for reducts, and a number of reducts in the ensemble. Since the aim of the embodiments of FIGS. 1-16 may be to find the appropriate approximation of the model's predictions, according to the embodiments of FIGS. 1-16, the operations described may use the grid search to tune the hyper-parameter settings. The final selection of the surrogate model may be made when the approximation quality measured with Cohen's Kappa reaches at least 0.9.

If the desired quality cannot be achieved, according to the embodiments of FIGS. 1-16, the operations described may train the reduct ensemble with settings that may ensure the highest possible approximation quality. The resulting approximator may later be used to determine neighborhoods of instances from the diagnosed data and to compute values of our diagnostic attributes.

Diagnostic Attributes

According to the embodiments of FIGS. 1-16 the operations described may compute a number of diagnostic attributes to characterize each instance. Values of these attributes may be derived by analyzing observations from instances' neighborhoods. In this process, according to the embodiments of FIGS. 1-16, the operations described may assume access to predictions of the diagnostic model for the diagnosed data table.

Diagnostic Method Workflow

According to the embodiments of FIGS. 1-16, the operations described may use the set of instances and diagnostic model predictions for these instances to prepare an approximator of model. According to the embodiments of FIGS. 1-16, the operations described may calculate the approximations and neighborhoods for all instances. According to the embodiments of FIGS. 1-16 the operations described may also compute diagnostic attributes defined therein. In the second step, according to the embodiments of FIGS. 1-16, the operations described may run a global diagnostics of the model. For this purpose, according to the embodiments of FIGS. 1-16 the operations described may compute a summary of the diagnostic attribute values, and may use a pretrained classifier to assign into one of three categories: Near optimal fit, Under-fitted model, and Over-fitted model. The classifier may be pretrained on a collection of diagnostic attribute summaries computed for a large number of data sets and commonly used prediction models. According to the embodiments of FIGS. 1-16 the operations described may use a simple random forest classifier for this task, however, other types of models, including classifier ensembles may be applied.

In the next step, according to the embodiments of FIGS. 1-16, the operations described may focus on the investigation of individual data instances and predictions. According to the embodiments of FIGS. 1-16, the operations described may use the previously computed diagnostic attribute values and the output of the global diagnostic model to provide a comprehensive analysis of model predictions and potentially related issues. Additionally, According to the embodiments of FIGS. 1-16, the operations described may apply a set of local diagnostic rules defined by experts to provide end-users with accessible insights. If the model is diagnosed as over-fitted, and for a given erroneously classified instance model's uncertainty was low, and its neighborhood was not small, then it may be that the mistake was caused by over-fitting.

Improve the Model Fitting Procedure.

If the model was diagnosed as under-fitted, and for a given erroneously classified instance model's uncertainty was high, and its neighborhood was not small, then it may be that the mistake was caused by under-fitting. If the diagnosed instance has a very small neighborhood, i.e., is dissimilar to training instances, then it may be that the instance was an outlier.

In the last step, according to the embodiments of FIGS. 1-16, the operations described may prepare visual reports that may highlight the most significant findings. Visualizations may showcase all relevant statistics related to the diagnostic model and its approximator quality, as well as distributions of diagnostic attributes. Interactive plots may allow end-users to investigate diagnoses for individual instances and may analyze their statistics for selected groups. Finally, the report may provide useful information on the importance of original attributes that is approximated by the importance of attributes in the surrogate model.

According to the embodiments of FIGS. 1-16, the operations described may start the experimental evaluation of the embodiments of FIGS. 1-16 technology with the preparation of benchmark data sets. In total, according to the embodiments of FIGS. 1-16, the operations described may use 23 benchmark data sets describing various classification tasks, which may range from binary classification to multi-class problems. Datasets may be obtained from an open repository OpenML3. The benchmark data sets may be chosen such that each predefined test partition (which according to the embodiments of FIGS. 1-16, the operations described may be used to diagnose the models) may contain at least 100 data instances.

For each of the selected data sets, according to the embodiments of FIGS. 1-16, the operations described may fit seven prediction model types, i.e., lasso regression, SVM with Gaussian kernel, naive Bayes, decision tree, multi-layer perceptron, random forest, and XGBoost. Each model may be fitted with three different hyper-parameter settings corresponding to different model generalization capability levels. These hyper-parameter settings may be tuned separately for each data set, and the resulting models may be labeled by four independent experts with one of four possible labels:

Near optimal fit—the performance of the model may be close to the best possible prediction performance reported in the literature for a given data set. Under-fitted model—the model may be over-generalized or may not be sufficiently fitted to the available training data. This may manifest in relatively low prediction quality on both training and validation data. Over-fitted model—the model may be closely fitted to the training data, however, its generalization quality (measured on a validation set) may be poor. A border case model—this label may be used if an expert could not decide which of the three previous labels should be assigned.

Predictions of the fitted models may be analyzed using the methodology described in herein. In particular, according to the embodiments of FIGS. 1-16, the operations described may compute the model approximations and diagnostic attribute values for each test instance from diagnosed (validation) sets. According to the embodiments of FIGS. 1-16, the operations described may run the diagnostics only for the models for which at least three out of four experts had assigned the same label. Thus, according to the embodiments of FIGS. 1-16, the operations described may obtain 440 sets of diagnosed (data set, model) pairs with labels from the set (Near optimal fit, Under-fitted model, Over-fitted model). The total number of instances in the resulting sets may be 419,699. According to the embodiments of FIGS. 1-16, the operations described may use this data in two experiments that aim to evaluate the ability of the embodiments of FIGS. 1-16 to distinctively describe erroneous predictions, and the ability to distinguish between models with different generalization capabilities.

Moreover, for each of these 440 data sets, according to the embodiments of FIGS. 1-16, the operations described may examine the execution time of the entire workflow. Obtained results may show that run time depends on the number of instances and attributes. The overall average may be 29 seconds with a high standard deviation of 56 seconds. It may show a very strong diversity of results. For a better understanding, according to the embodiments of FIGS. 1-16, the operations described may divide the analyzed data sets into three clusters: 1) Small data sets (number of instances may be ≤10000, number of attributes may be ≤500 and may be 12 seconds on average with a standard deviation of 11 seconds. 2) data sets may be with a number of attributes>500—95 seconds on average with a standard deviation of 42 seconds. 3) data sets may be with a number of instances>10000—240 seconds on average with a standard deviation of 77 seconds. Calculations may be conducted on a machine with 8 CPUs and 32 GB RAM.

Verification of Mistake Identification Capabilities:

The first experiment may be aimed at the verification of the ability of the embodiments of FIGS. 1-16 to distinctively describe erroneous predictions. To this end, a test may be prepared that checks if the representation of instances by vectors of the diagnostic attribute values preserves the similarity in the context of mistakes that may be made by the diagnostic model. In particular, according to the embodiments of FIGS. 1-16, the operations described may check that if the model made a mistake for a particular instance, the description of such an instance in terms of diagnostic attributes may be more similar to some other erroneous data instances than to instances for which the model may have worked correctly.

To test it, according to the embodiments of FIGS. 1-16, the operations described may check the accuracy of the 1-nearest neighbor classifier in recognizing erroneous predictions based on diagnostic attribute values. According to the embodiments of FIGS. 1-16, the operations described may conduct this experiment in three different evaluation setups corresponding to realistic application scenarios: 1) According to the embodiments of FIGS. 1-16, the operations described may estimate the classification performance using the leave-one-data-set-out test. This experiment may allow the embodiments of FIGS. 1-16 to verify the usefulness of our diagnostic attributes in a scenario when according to the embodiments of FIGS. 1-16, the operations described may analyze a known prediction model type on a new, previously unseen data set. 2) According to the embodiments of FIGS. 1-16, the operations described may estimate the classification performance using the leave-one-model-out test. This scenario may correspond to a situation when, according to the embodiments of FIGS. 1-16, the operations described analyze a completely new type of classification model. However, according to the embodiments of FIGS. 1-16, the operations described may still have a chance to run some standard diagnostic benchmarks on the available data beforehand. 3) According to the embodiments of FIGS. 1-16, the operations described may estimate the classification performance using the standard cross-validation test and may include a stratified division of data between folds. This standard benchmark scenario may be included as a reference. It may correspond to a situation when, according to the embodiments of FIGS. 1-16, the operations described may diagnose a commonly used type of predictive model on a previously known data set.

Before the experiment, the diagnostic attributes may be linearly scaled to the [0, 1] interval. The nearest neighbor algorithm may use the Euclidean distance, and due to the imbalanced distribution of mistakes, its performance may be measured using three different metrics, i.e., standard accuracy, balanced accuracy, and Cohen's Kappa coefficient. The results may show that the global diagnostic of prediction models using our diagnostic attributes may be feasible. All considered measures may indicate that random forest may be able to distinguish between the three considered model classes significantly better than random or naive (majority) predictions. Since in the discussed experiments, according to the embodiments of FIGS. 1-16, the operations described may not optimize the hyper-parameter settings or select the most efficient prediction model for this task, further improvements of the presented metrics may be possible.

As in the previous experiment, the comparison of the performance between different scenarios may show that the global diagnostic of a prediction model may be most difficult when it is done on a completely new data set (the first scenario). For all metrics, the results for scenario 1 may be significantly lower than for scenario 2, i.e., the p-value of a paired, one-sided Wilcoxon rank test may be ≤0.01 for the accuracy and Cohen's Kappa measures, and it may be ≤0.02 for the balanced accuracy measure. The differences between scenarios 2 and 3 may be even greater.

According to the embodiments of FIGS. 1-16, the operations described also investigated the influence of individual attributes on the performance of global model diagnostics. Shapley values for the model's attributes may be calculated, and then may be aggregated by individual diagnostic attributes. One of the expected findings may be the fact that models with a large balanced accuracy value may be more likely to be classified as Near optimal fit and less likely as over- or under-fitted. There may also be an intuitive dependency between the neighborhood size and predictions into the over-fitted and under-fitted class. A dominance of small neighborhoods may make a model more likely to be classified as over-fitted, whereas if the most of neighborhoods are very large, then the model may be more likely to be classified as under-fitted.

In another embodiment, a system includes a processing system comparing a bank of computation processors and associated memory, a network, and a diagnostic module coupled with the processing system through the network. The diagnostic module further comprises an ingestion module to form a diagnostic model 102 using machine learning by ingesting trusted operational data 104. The trusted operational data 104 may be any one of a supply chain data, a sales data, a purchase data, a fulfillment data, a sensory capture data, an observation data, an empirical data, a historical data, an industrial data, or a financial data. The system further contains a matching module to determine that a predictive data 304 produced by an evaluated model 302 for a period of time 350 does not match a known trusted data 306 for the period of time 350, an optimization module to analyze whether the predictive data 304 produced by the evaluated model 302 for the period of time 350 may be an optimal result of the evaluated model 302, a mistake-identification module to determine that a mistake occurred when the predictive data 304 may be not the optimal result of the evaluated model 302, an explanation module to explain a cause 312 of the mistake 310 using the diagnostic model 102, and a tuning module to fine-tune the diagnostic model 102 based on learnings from a past predictive data 402 for different periods of time 450 when compared with past known trusted data 406 for the different periods of time 450 using the processing system.

The system may further comprise an explanation module to compare the predictive data 304 of the evaluated model 302 with a predictive data 304A (e.g. a simulated data, which may be the output of the evaluated model 302) of the diagnostic model 102 when the mistake 310 may be observed to explain the cause 312 of the mistake 310 using the diagnostic model 102. Furthermore, explaining the cause 312 of the mistake 310 may be applied to diagnose a black-box model 502 without requiring any knowledge about technical specifications of a specific machine learning algorithm 508 of the black-box model 502 and without having direct access to it, and the diagnostic model 102 may be applied on a diagnosed dataset 506 and an output 504 of the evaluated model 302 comprising at least one of a prediction 510 and a classification, without using predictions (e.g., prediction 510) on a training data set 500.

The system may further comprise a natural language module to generate a most probable explanation of the cause 312 of the mistake 310 as a natural language text. The system may further comprise a label-analysis module to determine the cause 312 of the mistake 310 may be because a labeling of a historical training data set 500 on which the evaluated model 302 was formed was erroneous. The system may further comprise an external-change module to determine the cause 312 of the mistake 310 may be because an external condition changed that caused the predictive data 304 produced by the evaluated model 302 to no longer conform to predictive trends.

In yet another embodiment, a method includes determining that a predictive data 304 produced by an evaluated model 302 for a period of time 350 does not match a known trusted data 306 for the period of time 350, analyzing whether the predictive data 304 produced by the evaluated model 302 for the period of time 350 may be an optimal result of the evaluated model 302, determining that a mistake occurred when the predictive data 304 may not be the optimal result of the evaluated model 302, and explaining a cause 312 of the mistake 310 using a diagnostic model 102. Furthermore, the method compares the predictive data 304 of the evaluated model 302 with a predictive data 304A (e.g. a simulated data, which may be the output of the evaluated model 302) of the diagnostic model 102 when the mistake 310 may be observed to explain the cause 312 of the mistake 310 using the diagnostic model 102.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The invention claimed is:

1. A method comprising:

forming a diagnostic model using machine learning by ingesting trusted operational data, wherein the trusted operational data is any one of a supply chain data, a sales data, a purchase data, a fulfillment data, a sensory capture data, an observation data, an empirical data, a historical data, an industrial data, and a financial data, wherein the diagnostic model comprises a rough-set-based surrogate machine learning model approximator comprising an ensemble of approximate reducts derived from a historical training dataset associated with the trusted operational data;

determining that a predictive data produced by an evaluated model for a period of time does not match a known trusted data for the period of time;

identifying a mistake of the evaluated model based on the predictive data not matching the known trusted data;

explaining a cause of the mistake using the diagnostic model by (i) computing, through the ensemble of approximate reducts, a specific neighborhood of a current instance corresponding to the predictive data, wherein the neighborhood relative to a single reduct is a subset of instances from the historical training dataset belonging to a same indiscernibility class as the current instance, and a final neighborhood is a sum of neighborhoods computed for all reducts in the ensemble with weights expressing how representative the instances are for a given neighborhood; (ii) determining a similarity measure between the current instance and historical instances through counting how many reducts in the ensemble process a given pair of instances in a same way; and (iii) deriving, from contents of the computed neighborhood, a set of diagnostic attributes that constitute an input to a set of diagnostic rules linking values of the diagnostic attributes to a set of possible causes of the mistake; and fine-tuning the diagnostic model based on learnings from a past predictive data for different periods of time when compared with past known trusted data for the different periods of time using a processor and a memory.

2. The method of claim 1 further comprising:
comparing the predictive data of the evaluated model with a simulated prediction of the diagnostic model when the mistake is observed to explain the cause of the mistake using the diagnostic model, and
wherein the explaining the cause of the mistake is applied to diagnose a black-box model without requiring any knowledge about technical specifications of a specific machine learning algorithm of the black-box model and without having direct access to it, and
wherein the diagnostic model is applied on a diagnosed dataset and an output of the evaluated model comprising at least one of a prediction and a classification, without using predictions on a training set.

3. The method of claim 1 further comprising:
generating a most probable explanation of the cause of the mistake as a natural language text.

4. The method of claim 1, further comprising:
determining the cause of the mistake is because a labeling of the historical training dataset on which the evaluated model was formed was erroneous.

5. The method of claim 1, further comprising:
determining the cause of the mistake is because an external condition changed that caused the predictive data produced by the evaluated model to no longer conform to predictive trends.

6. The method of claim 1, further comprising:
determining the cause of the mistake is because of an error in an input data to the evaluated model.

7. The method of claim 6 wherein the error in the input data is caused by any one of an inaccurate sensor reading, a human error, and an anomaly.

8. The method of claim 1, further comprising:
determining the cause of the mistake is because an input data is a novel scenario from previous input scenarios, and the evaluated model is unprepared in the novel scenario.

9. The method of claim 1, further comprising:
determining the cause of the mistake is because of concept drift in a relationship between an input data and the predictive data caused because a property of a target variable has changed over time.

10. The method of claim 1, further comprising:
determining the cause of the mistake is because the evaluated model is underfitted because while a similar input data to an input data happened in the past, the evaluated model was not sufficiently fitted to the input data.

11. The method of claim 1, further comprising:
determining the cause of the mistake is because the evaluated model is overfitted because the diagnosed machine learning model is unable to generalize away from a narrow band of deep optimizations to extrapolate to a general case.

12. The method of claim 1, further comprising:
determining the cause of the mistake is because the evaluated model is based on an anomaly meaning that normally the evaluated model would be correct and that a human decision maker would most likely make the same mistake in this special case because of a unique condition of an input data now received.

13. The method of claim 11 wherein the mistake is caused by a non-determinism of a problem.

14. The method of claim 1, further comprising:
determining the cause of the mistake is because an input data to the evaluated model is based on an intentional attack caused by malignant actors attempting to undermine an integrity of the evaluated model.

15. The method of claim 14 wherein the intentional attack is an intentional modification of the input data to the model.

16. The method of claim 14, further comprising:
determining the cause of the mistake and a corresponding fix recommendation, which suggests how to improve performance of the evaluated model; and
generating a visual report emphasizing a ranked set of important findings based on an order of importance, and which comprise relevant statistics related to the evaluated model, the quality of its approximator, and the distributions of a diagnostic attribute,
wherein the visual report includes an interactive plot to help to explore diagnoses for individual instances and analyze their statistics for specific groups, and
wherein the visual report provides insights on the importance of original attributes, approximated by significance of attributes in the diagnostic model.

17. The method of claim 1, further comprising:
generating reports containing relevant statistics related to the diagnostic model, the quality of its approximator, and the distributions of diagnostic attributes,
wherein the diagnostic model is a system that is responsible for making a diagnosis of causes of errors made by the evaluated model that is being diagnosed and whose prediction is already a concrete cause of error.

18. The method of claim 17, further comprising: generating interactive plots to explore diagnoses for individual instances and analyze their statistics for specific groups.

19. The method of claim 1, further comprising: determining the importance of original attributes, approximated by the significance of attributes in the diagnostic model.

20. The method of claim 1 further comprising:
generating a set of historical neighborhoods comprising a set of historical instances that were processed in a similar way to a current instance on which mistakes of the evaluated model are observable, wherein the set of historical neighborhoods is used as a basis for forming the diagnostic model.

21. The method of claim 1 further comprising:
forming the diagnostic model as a decision model which obtains vectors of the set of diagnostic attributes as an input data; and
delivering a most probable cause of the mistake as an output data of the diagnostic model.

22. The method of claim 17 further comprising:
forming the diagnostic model based on an analysis of mistakes registered in the set of neighborhoods.

23. The method of claim 22 further comprising:
analyzing the specific neighborhood to determine characteristics comprising at least one of consistency of ground truth labels, consistency of original model predictions, consistency of approximations, neighborhood size, and uncertainty of predictions; and
determining a set of characteristics through analyzing the specific neighborhood to determine consistency of labels comprising at least one of ground truth labels, original model predictions, approximations, size, and uncertainty of predictions.

24. The method of claim 1 further comprising:
specifying diagnostic attributes that can be derived from contents of computed neighborhoods through analyzing the specific neighborhood to determine characteristics and through determination of the set of characteristics; and providing meaningful information on model operations by including the set of characteristics as diagnostic attributes that constitute an input in diagnostic rules.

25. The method of claim 1 further comprising:

linking the values of the diagnostic attributes to a set of possible causes of mistakes.

26. The method of claim 1 wherein when a neighborhood of a particular current instance is in at least one of a null and a minimal condition, then a probable cause of the mistake of the evaluated model on the particular current instance is that this is a totally new dissimilar case to historic cases and the evaluated model was unprepared for such cases.

27. The method of claim 1, wherein the ensemble of approximate reducts is derived through automatically applying a method of discretization and a heuristic optimization method.

28. The method of claim 1 wherein the discretization comprises a quantile method that produces intervals each containing approximately a same number of instances.

29. The method of claim 1 further comprising: analyzing the specific neighborhood to determine characteristics comprising at least one of consistency of ground truth labels, consistency of original model predictions, consistency of approximations, neighborhood size, and uncertainty of predictions.

30. The method of claim 1 wherein when the specific neighborhood of the current instance is in at least one of a null and a minimal condition, the cause of the mistake is identified as a totally new dissimilar case to historic cases for which the evaluated model was unprepared.

31. A system comprising:

a processing system comprising a bank of computation processors and associated memory;

a network;

a diagnostic module coupled with the processing system through the network, further comprising:

a ingestion module to form a diagnostic model using machine learning by ingesting trusted operational data, wherein the trusted operational data is any one of a supply chain data, a sales data, a purchase data, a fulfillment data, a sensory capture data, an observation data, an empirical data, a historical data, an industrial data, and a financial data, wherein the diagnostic model comprises a rough-set-based surrogate machine learning model approximator comprising an ensemble of approximate reducts derived from a historical training dataset associated with the trusted operational data;

a matching module to determine that a predictive data produced by an evaluated model for a period of time does not match a known trusted data for the period of time;

a mistake-identification module to identify a mistake of the evaluated model based on the predictive data not matching the known trusted data;

an explanation module to explain a cause of the mistake using the diagnostic model by (i) computing, through the ensemble of approximate reducts, a specific neighborhood of a current instance corresponding to the predictive data, wherein the neighborhood relative to a single reduct is a subset of instances from the historical training dataset belonging to a same indiscernibility class as the current instance, and a final neighborhood is a sum of neighborhoods computed for all reducts in the ensemble with weights expressing how representative the instances are for a given neighborhood; (ii) determining a similarity measure between the current instance and historical instances through counting how many reducts in the ensemble process a given pair of instances in a same way; and (iii) deriving, from contents of the computed neighborhood, a set of diagnostic attributes that constitute an input to a set of diagnostic rules linking values of the diagnostic attributes to a set of possible causes of the mistake; and a tuning module to fine-tune the diagnostic model based on learnings from a past predictive data for different periods of time when compared with past known trusted data for the different periods of time using the processing system.

32. The system of claim 31 further comprising:

an explanation module to compare the predictive data of the evaluated model with a simulated prediction of the diagnostic model when the mistake is observed to explain the cause of the mistake using the diagnostic model, and wherein the explaining the cause of the mistake is applied to diagnose a black-box model without requiring any knowledge about technical specifications of a specific machine learning algorithm of the black-box model and without having direct access to it, and wherein the diagnostic model is applied on a diagnosed dataset and an output of the evaluated model comprising at least one of a prediction and a classification, without using predictions on a training set.

33. The system of claim 32 further comprising:

a natural language module to generate a most probable explanation of the cause of the mistake as a natural language text.

34. The system of claim 33, further comprising:

a label-analysis module to determine the cause of the mistake is because a labeling of a historical training data set on which the evaluated model was formed was erroneous.

35. The system of claim 34, further comprising:

an external-change module to determine the cause of the mistake is because an external condition changed that caused the predictive data produced by the evaluated model to no longer conform to predictive trends.

36. A method comprising:

forming a diagnostic model using machine learning by ingesting trusted operational data, wherein the diagnostic model comprises a rough-set-based surrogate machine learning model approximator comprising an ensemble of approximate reducts derived from a historical training dataset associated with the trusted operational data;

determining that a predictive data produced by an evaluated model for a period of time does not match a known trusted data for the period of time;

identifying a mistake of the evaluated model based on the predictive data not matching the known trusted data;

explaining a cause of the mistake using the diagnostic model by (i) computing, through the ensemble of approximate reducts, a specific neighborhood of a current instance corresponding to the predictive data, wherein the neighborhood relative to a single reduct is a subset of instances from the historical training dataset belonging to a same indiscernibility class as the current instance, and a final neighborhood is a sum of neighborhoods computed for all reducts in the ensemble; (ii) determining a similarity measure between the current instance and historical instances through counting how many reducts in the ensemble process a given pair of instances in a same way; and (iii) deriving, from contents of the computed neighborhood, a set of diagnostic attributes that constitute an input to a set of diagnostic rules linking values of the diagnostic attributes to a set of possible causes of the mistake;

comparing the predictive data of the evaluated model with a simulated prediction of the diagnostic model when the mistake is observed to explain the cause of the mistake using the diagnostic model; and fine-tuning the diagnostic model based on learnings from a past predictive data for different periods of time when compared with past known trusted data for the different periods of time using a processor and a memory.

37. The method of claim 36:

wherein the explaining the cause of the mistake is applied to diagnose a black-box model without requiring any knowledge about technical specifications of a specific machine learning algorithm of the black-box model and without having direct access to it, and wherein the diagnostic model is applied on a diagnosed dataset and an output of the evaluated model comprising at least one of a prediction and a classification, without using predictions on a training set.

38. The method of claim 37 further comprising:

generating a most probable explanation of the cause of the mistake as a natural language text.

39. The method of claim 38 further comprising:

determining the cause of the mistake is because a labeling of a historical training data set on which the evaluated model was formed was erroneous.

40. The method of claim 39 further comprising:

determining the cause of the mistake is because an external condition changed that caused the predictive data produced by the evaluated model to no longer conform to predictive trends.

41. The method of claim 40, further comprising:

determining the cause of the mistake is because of an error in an input data to the evaluated model.

* * * * *